United States Patent
Chen

(10) Patent No.: US 9,747,020 B2
(45) Date of Patent: Aug. 29, 2017

(54) INFORMATION TRANSMITTING METHOD, DEVICE AND TERMINAL

(71) Applicant: Lenovo (Beijing) Co., Ltd., Beijing (CN)

(72) Inventor: Shi Chen, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 512 days.

(21) Appl. No.: 14/164,733

(22) Filed: Jan. 27, 2014

(65) Prior Publication Data
US 2014/0223332 A1    Aug. 7, 2014

(30) Foreign Application Priority Data
Feb. 6, 2013    (CN) .......................... 2013 1 0048411

(51) Int. Cl.
*G06F 3/0488* (2013.01)
*G06F 3/0484* (2013.01)
*G06F 3/0486* (2013.01)

(52) U.S. Cl.
CPC .......... *G06F 3/0488* (2013.01); *G06F 3/0484* (2013.01); *G06F 3/0486* (2013.01)

(58) Field of Classification Search
CPC ..... G06F 3/0484; G06F 3/0486; G06F 3/0488
USPC ................... 345/156–178; 715/700–866
See application file for complete search history.

(56) References Cited

U.S. PATENT DOCUMENTS

| 8,887,092 B2 * | 11/2014 | Morrow | G06F 3/0482 715/711 |
| 2011/0111697 A1 * | 5/2011 | Lazaridis | H04M 1/7253 455/41.2 |
| 2013/0021275 A1 | 1/2013 | Li et al. | |

FOREIGN PATENT DOCUMENTS

| CN | 102035808 A | 4/2011 | |
| CN | 102478986 A | 5/2012 | |
| CN | 102855073 A | 1/2013 | |
| WO | WO 2013074102 A1 * | 5/2013 | ........... G06F 3/0486 |

OTHER PUBLICATIONS

First Chinese Office Action regarding Application No. 201310048411.3 dated Sep. 1, 2016. English translation provided by http://globaldossier.uspto.gov.

* cited by examiner

*Primary Examiner* — Michael Pervan
(74) *Attorney, Agent, or Firm* — Harness, Dickey & Pierce, P.L.C.

(57) ABSTRACT

An information transmitting method is applied to a first electronic device, and the first electronic device stores at least one piece of contact information in a contact information set. The method includes: determining a first object and a second object, wherein the first object is determined after a display unit displays the first object, the second object is determined after the display unit displays at least a first part of the contact information set, the first object corresponds to first information, the second object corresponds to second information, and the second information is second contact information; determining transmission information in accordance with the first information corresponding to the first object; determining a transmission parameter in accordance with the second contact information corresponding to the second object; and transmitting the transmission information (Continued)

to a second electronic device by utilizing the determined transmission parameter.

19 Claims, 11 Drawing Sheets

INFORMATION TRANSMITTING METHOD, DEVICE AND TERMINAL

This application claims the priority of Chinese Patent Application No. 201310048411.3, entitled "INFORMATION TRANSMITTING METHOD, DEVICE AND TERMINAL", filed with the Chinese Patent Office on Feb. 6, 2013, which is incorporated by reference in its entirety herein.

FIELD OF THE INVENTION

The disclosure relates to the field of an electronic device, and particularly to an information transmitting method, a device and a terminal.

BACKGROUND OF THE INVENTION

When using an electronic device, a user commonly needs transmit information sent by one contact person in an address book to another contact person. In the prior art, a method is provided, which includes: selecting, by user, one contact person in the address book, copying information corresponding to the selected contact person, pasting the copied information into transmission content at a short message editing interface, manually inputting or searching an address of a target contact person, and then transmitting the information of the selected contact person to the target contact person by means of a short massage. Complicated operations are performed in this method. Specifically, with this method, the user not only needs to edit the information of the selected contact person into the transmission content through a complicated operation, but also needs to manually input the address of the target contact person or select the address of the target contact person by searching for the address book. Therefore, the method can not provide a simple operation way to transmit information to a contact person quickly, and is not convenient for the user to use.

SUMMARY OF THE INVENTION

To solve the above technical problems, an information transmitting method, a device and a terminal are provided according to embodiments of the disclosure, which are capable of transmitting information quickly to a target device through a simple operation. The technical solutions are described as follows.

According to a first aspect of the embodiments of the disclosure, an information transmitting method is disclosed. The method is applied to a first electronic device, and the first electronic device stores at least one piece of contact information in a contact information set. The method includes:

determining a first object and a second object, wherein the first object is determined after a display unit of the first electronic device displays the first object, the second object is determined after the display unit of the first electronic device displays at least a first part of the contact information set, the first object corresponds to first information, the second object corresponds to second information, and the second information is second contact information;

determining transmission information in accordance with the first information corresponding to the first object;

determining a transmission parameter in accordance with the second contact information corresponding to the second object; and transmitting the transmission information to a second electronic device by utilizing the determined transmission parameter.

Preferably, the display unit of the first electronic device is a touch sensing unit, and the determining a first object and a second object includes:

detecting, by the touch sensing unit, a first preset input operation and determining the first object and the second object in accordance with the first preset input operation, wherein the first preset input operation is a continuous input operation.

Preferably, the detecting, by the touch sensing unit, a first preset input operation and determining the first object and the second object in accordance with the first preset input operation includes:

detecting, by the touch sensing unit, the first preset input operation;

acquiring a movement trajectory of the first preset input operation;

acquiring a start position and an end position of the movement trajectory in the case that the movement trajectory is a continuous trajectory; and determining a display object corresponding to the start position of the movement trajectory as the first object, and determining a display object corresponding to the end position of the movement trajectory as the second object.

Preferably, the first information corresponding to the first object is first contact information, and the display unit of the first electronic device displays the first object in a first part of the contact information set;

in the case that the touch sensing unit detects that the first preset input operation is a movement operation for the first object, the method further includes:

displaying a second part of the contact information set in the case that that the movement trajectory for the first preset input operation is detected to contact with a preset boundary of the display unit, wherein the second part of the contact information set is different from the first part of the contact information set, and at least the second object is displayed at the second part of the contact information set.

Preferably, the first information corresponding to the first object is first contact information, the display unit of the first electronic device displays the first object in a first part of the contact information set; the first preset input operation includes at least a first operation, wherein the first operation is a selection operation for the first object, and the method further includes:

detecting a third operation in the case that the first operation is detected;

judging whether the third operation is a second preset input operation, to acquire a first judgment result; and displaying a second part of the contact information set in the case that the first judgment result indicates that the third operation is the second preset input operation, wherein the second part of the contact information set is different from the first part of the contact information set, and the second part of the contact information set displays at least the second object.

Preferably, the first preset input operation includes a first operation and a second operation, wherein the first operation is an selection operation for the first object and the selection operation being performed continuously, the second operation is a movement operation for the first object, and the determining a second object includes:

acquiring a movement trajectory of the second operation, determining an end position of the movement trajectory, and determining a display object corresponding to the end position of the movement trajectory as a second object.

Preferably, the display unit of the first electronic device is divided into a first region and a second region, wherein at least the first object is displayed at the first region, and at least the second object is displayed at the second region, and the detecting a first preset input operation includes:

detecting an input operation; and in the case that the input operation is a movement operation from the first region to the second region and the movement operation associates the first object with the second object, determining the input operation as a first preset input operation.

Preferably, the display unit of the first electronic device includes a third region, wherein the first part of the contact information set is displayed at the third region and the third region is larger than the first region and the second region, and the method further includes:

after a first trigger instruction is detected, switching the display unit from displaying at the third region to displaying at the first region and the second region.

Preferably, a first part of the contact information set is displayed at the first region, a second part of the contact information set is displayed at the second region, and the first part of the contact information set is the same as or different from the second part of the contact information set.

Preferably, the method further includes:

in the case that a first sliding operation is detected at the first region of the display unit, generating a first control instruction to control the first region to switch from displaying the first part of the contact information set to displaying a third part of the contact information set, wherein the first object is located in the third part of the contact information set; and in the case that a second sliding operation is detected at the second region of the display unit, generating a second control instruction to control the second region to switch from displaying the second part of the contact information set to displaying a fourth part of the contact information set, wherein the second object is located in the fourth part of the contact information set.

Preferably, the first information corresponding to the first object is first contact information, the display unit of the first electronic device displays the first object in a first part of the contact information set, and the determining a first object and a second object includes:

detecting a fourth operation;

in the case that it is judged that the fourth operation is a selection operation for a display object of the display unit, determining the display object corresponding to the fourth operation as the first object;

displaying a second part of the contact information set in the case that a second trigger instruction is detected, wherein the second part of the contact information set is different from the first part of the contact information set, and at least a second object is displayed at the second part of the contact information set; and in the case that it is detected that a touch for the fourth operation is released, determining a display object corresponding to a release position of the touch as the second object.

Preferably, the first information corresponding to the first object is first contact information, the display unit of the first electronic device displays the first object in a first part of the contact information set, and the determining a first object and a second object includes:

detecting a fifth operation;

in the case that it is judged that the fifth operation is a selection operation for a display object of the display unit of the first electronic device and the selection operation satisfies a third preset condition, determining the display object corresponding to the fifth operation as the first object;

displaying a first identifier for the first object, wherein the first identifier is superposed upon a display object of the display unit of the first electronic device to be displayed;

displaying a second part of the contact information set in the case that a third trigger instruction is detected, wherein the second part of the contact information set is different from the first part of the contact information set, and at least a second object is displayed in the second part of the contact information set; and detecting a sixth operation, and in the case that it is judged that the sixth operation is a movement operation for the first identifier, acquiring a movement trajectory of the movement operation, and determining a display object corresponding to an end position of the movement trajectory as the second object.

Preferably, the determining a first object and a second object includes:

acquiring a first selection operation and determining a first object in accordance with the first selection operation; and acquiring a second selection operation and determining a second object in accordance with the second selection operation, wherein the first selection operation happens before the second selection operation.

Preferably, the display unit includes a first region and a second region, and the determining a first object and a second object includes:

acquiring a third selection operation, wherein the third selection operation is an operation for at least one display object of the first region;

acquiring a fourth selection operation, wherein the fourth selection operation is an operation for at least one display object of the second region; and determining the at least one display object selected in the first region as the first object and determining the at least one display object selected in the second region as the second object.

Preferably, a second identifier is displayed at the first region of the display unit, a third identifier is displayed at the second region of the display unit, and the determining the at least one display object selected in the first region as the first object and the determining the at least one display object selected in the second region as the second object include:

performing sliding operations on the first region and the second region respectively in accordance with an operation of a user; and determining a display object superposed with the second identifier as the first object, and determining a display object superposed with the third identifier as the second object.

Preferably, the determining a first object and a second object includes:

determining the first object and the second object in the case that the display unit of the first electronic device displays the first object and the second object simultaneously.

Preferably, the transmitting the transmission information by utilizing the determined transmission parameter includes:

selecting, by utilizing the determined transmission parameter, a transmission application corresponding to the transmission parameter, to transmit the transmission information.

According a second aspect of the embodiments of the disclosure, a first electronic device is disclosed, including:

an object determination unit adapted to determine a first object and a second object in the case that the first electronic device stores at least one piece of contact information in a contact information set, wherein the first object is determined after a display unit of the first electronic device displays the first object, the second object is determined after the display unit of the first electronic device displays at least a first part of the contact information set, the first object corresponds to first information, the second object corresponds to second information, and the second information is second contact information;

a transmission information determination unit adapted to determine transmission information in accordance with the first information corresponding to the first object;

a transmission parameter determination unit adapted to determine a transmission parameter in accordance with the second contact information corresponding to the second object; and a transmitting unit adapted to transmit the transmission information to a second electronic device by utilizing the determined transmission parameter.

Preferably, the display unit of the first electronic device is a touch sensing unit, and the object determination unit is adapted to detect a first preset input operation and determine the first object and the second object in accordance with the first preset input operation by utilizing the touch sensing unit, the first preset input operation is a continuous input operation.

Preferably, the object determination unit includes:

a first detection unit adapted to detect, by the touch sensing unit, a first preset input operation;

a first acquisition unit adapted to acquire a movement trajectory of the first preset input operation;

a second acquisition unit adapted to acquire a start position and an end position of the movement trajectory in the case that the movement trajectory is a continuous trajectory; and a first determination unit adapted to determine a display object corresponding to the start position of the movement trajectory as the first object, and determine a display object corresponding to the end position of the movement trajectory as the second object.

Preferably, the first information corresponding to the first object is first contact information, and the display unit of the first electronic device displays the first object in a first part of the contact information set; and the display unit of the first electronic device is further adapted to display a second part of the contact information set, in the case that the touch sensing unit detects that the first preset input operation is a movement operation for the first object and that the movement trajectory for the first preset input operation is detected to contact with a preset boundary of the display unit, wherein the second part of the contact information set is different from the first part of the contact information set, and at least the second object is displayed at the second part of the contact information set.

Preferably, the first information corresponding to the first object is first contact information, the display unit of the first electronic device displays the first object in a first part of the contact information set; the first preset input operation includes at least a first operation, wherein the first operation is a selection operation for the first object, and the first electronic device further includes:

a third detection unit adapted to detect a third operation in the case that the first operation is detected;

a first judging unit adapted to judge whether the third operation is a second preset input operation, to acquire a first judgment result; and wherein the display unit is further adapted to display a second part of the contact information set in the case that the first judgment result indicates that the third operation is the second preset input operation, wherein the second part of the contact information set is different from the first part of the contact information set, and at least the second object is displayed at the second part of the contact information set.

Preferably, the first preset input operation includes a first operation and a second operation, wherein the first operation is an selection operation for the first object and the selection operation being performed continuously, and the second operation is a movement operation for the first object, and the object determination unit is adapted to acquire a movement trajectory of the second operation, determine an end position of the movement trajectory, and determine a display object corresponding to the end position of the movement trajectory as the second object.

Preferably, the display unit of the first electronic device is divided into a first region and a second region, wherein at least the first object is displayed at the first region, and at least the second object is displayed at the second region, and the first detection unit is further adapted to detect an input operation; and in the case that the input operation is a movement operation from the first region to the second region and the movement operation is adapted to associate the first object with the second object, determine the input operation as a first preset input operation.

Preferably, the display unit of the first electronic device includes a third region, wherein the first part of the contact information set is displayed at the third region and an area of the third region is larger than an area of the first region and an area of the second region, and the display unit of the first electronic device is further adapted to switch the display unit from displaying at the third region to displaying at the first region and the second region, after a first trigger instruction is detected.

According to a third aspect of the embodiments of the disclosure, a first terminal is provided. The first terminal includes a display unit, and further includes:

a storage unit adapted to store at least one piece of contact information in a contact information set;

a processing unit adapted to determine a first object and a second object, wherein the first object is determined after the display unit of the first terminal displays the first object, the second object is determined after the display unit of the first terminal displays at least a first part of the contact information set, the first object corresponds to first information, the second object corresponds to second information, and the second information is second contact information; determine transmission information in accordance with the first information corresponding to the first object; and determine a transmission parameter in accordance with the second contact information corresponding to the second object; and a communication unit adapted to transmit the transmission information to a second electronic device by utilizing the determined transmission parameter.

In the embodiments of the disclosure, with the information transmitting method and the device provided by the embodiments of the disclosure, the first object and the second object can be determined through a simple operation, the transmission information can be automatically generated in accordance with the first information corresponding to the first object, the transmission parameter can be automatically determined in accordance with the second contact information corresponding to the second object, and the transmission information can be transmitted to the second electronic device by utilizing the determined transmission parameter. The method provided by the disclosure automatically transmits the information, so that the user neither needs to edit the transmission content, nor needs to manually input or search an address of a contact person. Therefore, the method can be simply implemented without a complicated operation, and is convenient for the user to use.

BRIEF DESCRIPTION OF THE DRAWINGS

In order to more clearly illustrate the technical solutions in embodiments of the disclosure or in the prior art, in the following, accompanying drawings referred to describe the embodiments or the prior art are introduced simply. Obviously, the accompanying drawings in the following description are just some embodiments recited in the disclosure. For those skilled in the art, other accompanying drawings can also be obtained based on these accompanying drawings provided herein without any creative work.

DETAILED DESCRIPTION OF EMBODIMENTS

An information transmitting method, a device and a terminal are provided according to embodiments of the disclosure, which are capable of transmitting information quickly to a target device through a simple operation.

In order to make those skilled in the art better understand the technical solutions in the disclosure, in the following, the technical solutions in the embodiments of the disclosure will be described clearly and completely in conjunction with the accompanying drawings in the embodiments of the disclosure. Obviously, the described embodiments are just a part of embodiments of the disclosure, rather than all embodiments. Based on the embodiments of the disclosure, all other embodiments obtained by those skilled in the art without any creative work will fall within the scope of protection of the disclosure.

Figure 1:
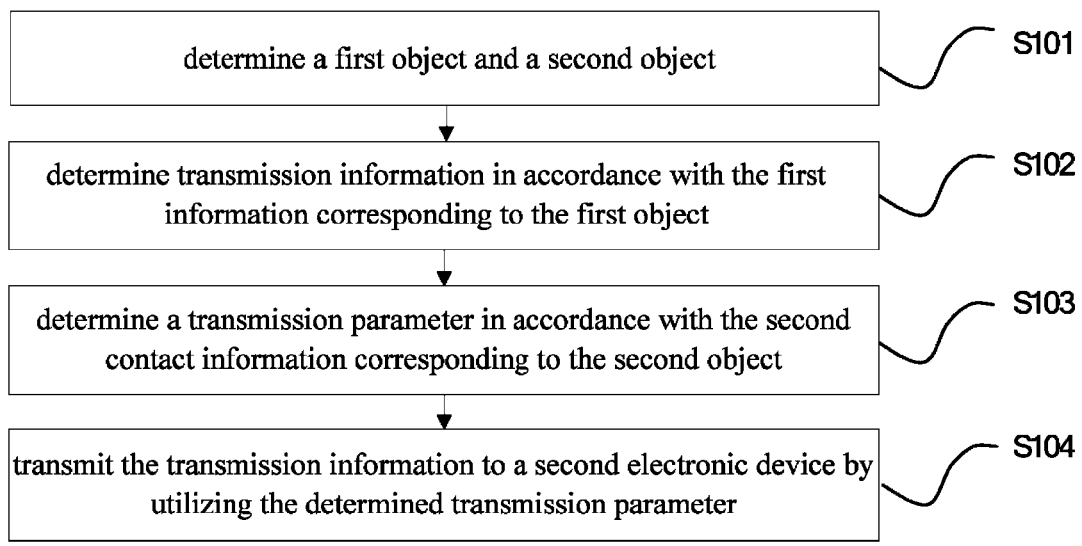
FIG. 1 is a schematic diagram of an information transmitting method according to a first embodiment of the disclosure.

Referring to FIG. 1, a flow chart of an information transmitting method according to a first embodiment of the disclosure is shown.

An information processing method is disclosed, which is applied to a first electronic device. The first electronic device includes but is not limited to a terminal, such as a mobile phone, a PAD and a computer. After the first electronic device stores at least one piece of contact information in a contact information set, the method includes steps S101-S104.

S101, determining a first object and a second object.

The first object is determined after a display unit of the first electronic device displays the first object. The second object is determined after the display unit of the first electronic device displays at least a first part of the contact information set. The first object corresponds to first information, the second object corresponds to second information, and the second information is second contact information. In one embodiment, a first object and a second object are determined in the case that the display unit of the first electronic device displays the first object and the second object simultaneously.

In one embodiment, the first object is one or more display objects in the display unit of the first electronic device. The first object corresponds to first information to be sent by the first electronic device. The first object may or may not correspond to contact information. For example, the first object may be an operable object, such as a folder icon and a file icon. The second object corresponds to second information, and the second information is second contact information. The second contact information corresponds to a target contact person or a target device to which the user wants to send information with the first electronic device.

There may be many different implementation ways for determining the first object and the second object. The first object and the second object may be determined by one input operation, or by two input operations. In the case that the first object and the second object is determined by one input operation, the input operation may be a continuous input operation, or a discontinuous input operation. In the following, a case that the input operation is a continuous input operation is first described.

When the display unit of the first electronic device is a touch sensing unit, a way for determining the first object and the second object may include: detecting, by the touch sensing unit, a first preset input operation; and determining the first object and the second object in accordance with the first preset input operation, where the first preset input operation is the continuous input operation. The continuous input operation refers to an operation in the process from a moment that the first electronic device detects an operator to a moment that the first electronic device does not detect the operator, i.e., an operation in the process from a moment that the operator contacts with a detection surface (a screen enclosure) of the touch sensing unit to a moment that the operator leaves from the detection surface. In the way, two objects, i.e., the first object and the second object, are determined according to one input operation and the input operation is an uninterrupted continuous input operation. A movement trajectory of this continuous input operation is a continuous trajectory.

When the first object and the second object are determining by one input operation, the input operation may also be a discontinuous input operation. In this case, a trajectory for the input operation is a discontinuous trajectory.

The first object and the second object may also be determined by two input operations. The other way for the determining a first object and a second object includes: acquiring a first selection operation; determining the first object in accordance with the first selection operation; acquiring a second selection operation; and determining a second object in accordance with the second selection operation. The first selection operation happens before the second selection operation.

The other way for the determining the first object and the second object includes: in the case that the display unit of the first electronic device includes a first region and a second region, acquiring a third selection operation, the third selection operation being an operation for at least one display object in the first region; acquiring a fourth selection operation, the fourth selection operation being an operation for at least one display object in the second region; determining the at least one display object selected in the first region as a first object; and determining the at least one display object selected in the second region as a second object.

Several ways for determining the first object and the second object are described above. Those skilled in the art may understand that the ways for determining the first object and the second object are flexible in the disclosure. Other implementation ways may also be obtained by those skilled in the art without any creative work, and the other implementation ways based on the concept of the disclosure will all fall within the scope of protection of the disclosure.

S102, determining transmission information in accordance with the first information corresponding to the first object.

In one embodiment, the content of the information to be transmitted is generated in accordance with the first information corresponding to the first object. For example, when the first object is a contact identifier, the first information corresponding to the first object is contact information, such as a mobile phone number, an email address, a mailing address and an Instant Message (IM) account. In this case, the first information corresponding to the first object is extracted, to generate the transmission information. When the first object corresponds to a file identifier, file data corresponding to the file identifier is acquired to generate transmission information.

S103, determining a transmission parameter in accordance with the second contact information corresponding to the second object.

In one embodiment, the second object corresponds to the second contact information, and the transmission parameter may be a mobile phone number, an email address, an IM account and the like.

S104, transmitting the transmission information to a second electronic device by utilizing the determined transmission parameter.

In one embodiment, a transmission application corresponding to the transmission parameter may be determined according to the determined transmission parameter, to transmit the transmission information. A priority of the transmission application corresponding to the transmission parameter may be preset. When there are multiple selectable transmission parameters, the priorities of the transmission applications corresponding to the determined transmission parameters are compared to obtain a comparison result. A transmission application with the highest priority is selected to transmit the transmission information in accordance with the comparison result. For example, it may be preset that a priority of a short message application is higher than a priority of an IM application, and a priority of the IM application is higher than a priority of an email application. Of course, those skilled in the art may understand that a system or the user may also preset a default application (an application in default), and use the default application to transmit the transmission information.

In the first embodiment of the disclosure, the first object and the second object may be determined through a simple operation, the transmission information may be automatically generated in accordance with the first information corresponding to the first object, the transmission parameter may be automatically determined in accordance with the second contact information corresponding to the second object, and the transmission information may be transmitted to a second electronic device by utilizing the determined transmission parameter. With the method provided by the disclosure, the information may be automatically transmitted, so that the user neither needs to edit the transmission content, nor needs to manually input or search an address of a contact person. Therefore, the method can be simply implemented without a complicated operation, and is convenient for the user to use.

Hereinafter, for example, in the case that the first object and the second object correspond to contact information, the information transmitting method provided by the disclosure will be illustrated. Those skilled in the art may understand that the method provided by the following embodiments may also be applied to a scenario that the first object does not correspond to the contact information. The implementations provided by the following embodiments may be applied separately, and may also be applied in combination. Modifications and variations to the embodiments of the disclosure by those skilled in the art without any creative work are all within the scope of protection of the disclosure.

Figure 2:
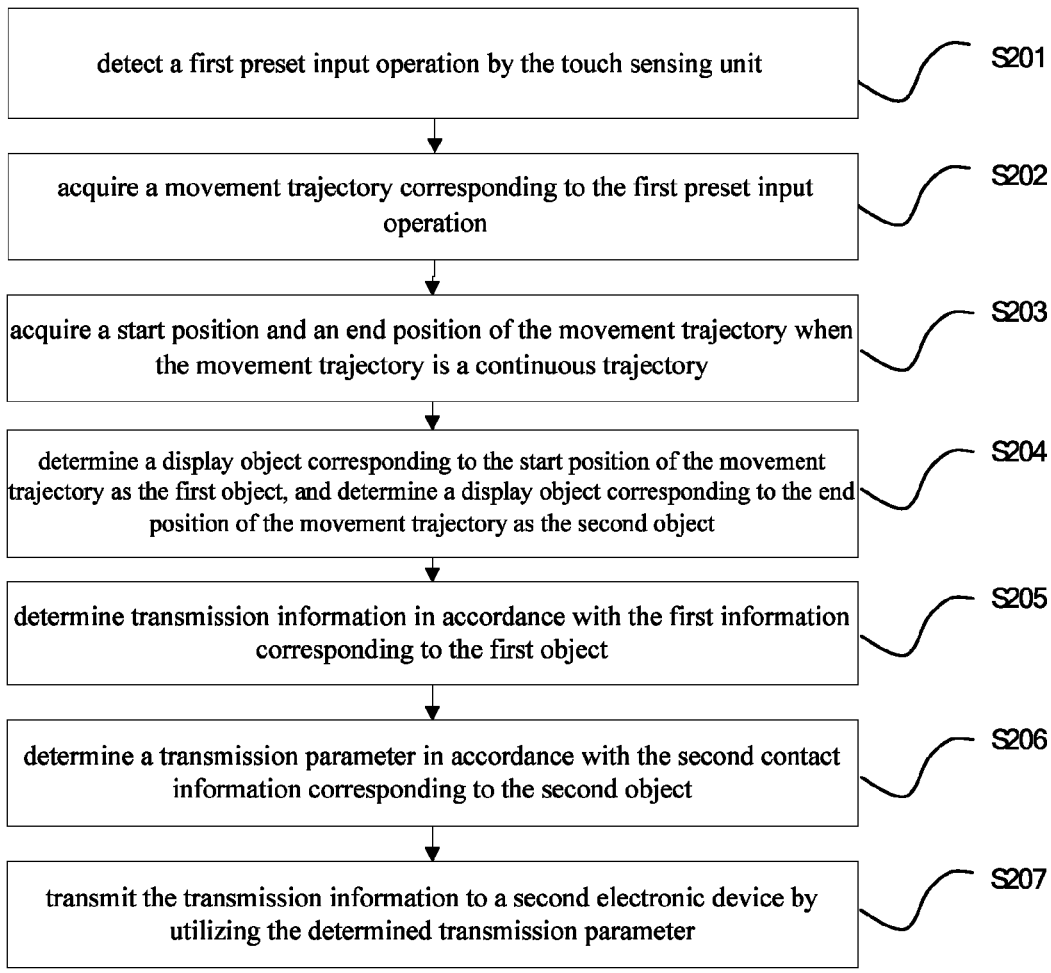
FIG. 2 is a schematic diagram of an information transmitting method according to a second embodiment of the disclosure.

Referring to FIG. 2, a flow chart of an information transmitting method according to a second embodiment of the disclosure is shown.

In the second embodiment of the disclosure, the first electronic device has a display unit which is a touch sensing unit. The method includes steps S201-S207.

S201, detecting a first preset input operation by the touch sensing unit.

In one embodiment, the first preset input operation is a continuous input operation. The continuous input operation refers to an operation in the process from a moment that the first electronic device detects an operator to a moment that the first electronic device does not detect the operator, i.e., an operation in the process from a moment that the operator contacts with a detection surface (a screen enclosure) of the touch sensing unit to a moment that the operator leaves from the detection surface. In this way, two objects, i.e., a first object and a second object, are determined according to one input operation, and the input operation is an uninterrupted continuous input operation. A movement trajectory of this continuous input operation is a continuous trajectory.

S202, acquiring a movement trajectory of the first preset input operation.

S203, acquiring a start position and an end position of the movement trajectory in the case that the movement trajectory is a continuous trajectory.

S204, determining a display object corresponding to the start position of the movement trajectory as the first object, and determining a display object corresponding to the end position of the movement trajectory as the second object.

S205, determining transmission information in accordance with first information corresponding to the first object.

S206, determining a transmission parameter in accordance with second contact information corresponding to the second object.

S207, transmitting the transmission information to a second electronic device by utilizing the determined transmission parameter.

The specific implementations of steps S205 to S207 may be the same as those of the corresponding steps in the first embodiment, which are not repeated here.

In the second embodiment of the disclosure, the first object and the second object are determined by detecting the preset continuous input operation, so that the user may determine the transmission content and the transmitting target object through one continuous input operation. Further, the transmission content and the transmission parameter may be automatically generated in accordance with the user's continuous input operation, and the transmission information may be automatically transmitted by utilizing the transmission parameter. Therefore, the method can be simply implemented, simplify the user's operation, and be convenient to use.

A third embodiment to a fifth embodiment of the disclosure will be described below, which are all embodiments obtained by changing or modifying the second embodiment.

In the third embodiment, the display unit may display in a divi-screen mode. Specifically, the display unit of the first electronic device is divided into a first region and a second region. At least first object is displayed at the first region, and at least second object displays at the second region.

In this embodiment, when the user opens an interface of address book, the interface of address book may be directly displayed on two divided screens, and may also be switched from displaying on a single screen to displaying on two divided screens. The implementation of the second case will be described in detail below.

Figure 3:
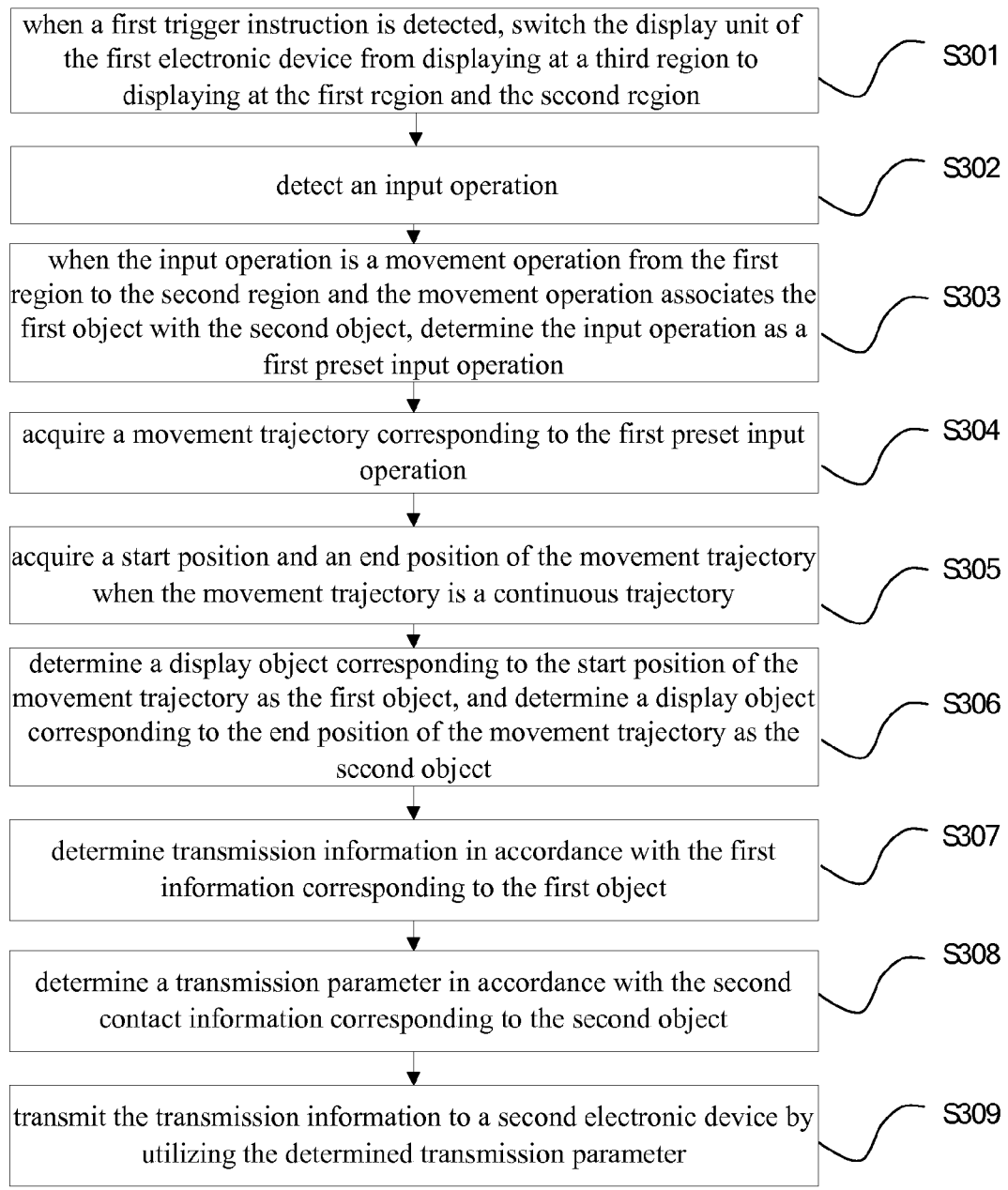
FIG. 3 is a schematic diagram of an information transmitting method according to a third embodiment of the disclosure.

Referring to FIG. 3, a flow chart of an information transmitting method according to a third embodiment of the disclosure is shown.

S301, in the case that a first trigger instruction is detected, switching a display operation of the display unit of the first electronic device from a third region to the first region and the second region.

The display unit of the first electronic device includes a third region. The third region displays a first part of the contact information set and the third region is larger than the first region and the second region.

In one embodiment, the first trigger instruction may be a preset input operation, or may be an operation for starting a shortcut function key. For example, when the first electronic device displays at the third region, a user's sliding operation is detected, which indicates that the first object is not displayed in the same page with the second object (the current page is used to display a part of the contact information set, such as the first part of the contact information set). In this case, the display unit may be triggered to display in the divi-screen mode, that is, the display unit of the first electronic device is switched from displaying at the third region to displaying at the first region and the second region. The first part of the contact information set is displayed at the first region, the second part of the contact information set is displayed at the second region, and the first part of the contact information set is the same as or different from the second part of the contact information set.

In one embodiment, if both the first object and the second object are not in the current page, i.e., are not included in the first part of the contact information set, the display contents of the display unit may be switched through a sliding or drag operation. In order to satisfy the user's requirements under this scenario, in an embodiment of the disclosure, the system may preset that the switching of the display contents of the display unit is triggered, that is, the display unit is switched from displaying the first part of the contact information set to displaying the second part of the contact information set, when a sliding or drag operation on the display unit is detected. Alternatively, the system may preset other preset input operations as the first trigger instruction, to switch the display unit of the first electronic device from displaying at the third region to displaying at the first region and the second region. One possible implementation way may include: determining an input operation as a first preset trigger instruction, when the display unit is a touch sensing unit and when the touch sensing unit detects a movement operation for at least two touch points which elongates the distance between the at least two touch points. In one embodiment, if the first object is not displayed in the same page as the second object or any one of the first object and the second object is not in the current page, for example, if the first object or the second object is not in the first part of the contact information set or any one of the first object and the second object is not in the currently displayed first part of the contact information set, the display unit may be triggered to display in the divi-screen mode by performing the preset input operation, i.e., the display unit is triggered to switch from displaying at the third region to displaying at the first region and the second region. When the user wants to display in the divi-screen mode, an operation of extending the distance of two touch point or dispersing the two touch points is the most natural gesture for the user. This gesture indicates that the user wants to perform a separate operation for the display objects. Therefore, in an embodiment of the disclosure, it is detected that the user clicks at least two touch points and performs a movement or sliding operation from the at least two touch points, and the movement or sliding operation elongates the distance between the at least two touch points gradually, that is, the user performs an extension or dispersion operation based on the at least two touch points. In this case, it is determined that the input gesture of the user is a preset gesture input, and then it is determined that the first trigger instruction is detected. It should be noted that, as for the movement or sliding operation for the at least two touch points, the movement directions corresponding to the at least two touch points are different. In one embodiment, the movement or sliding operation for the at least two touch points by the user may increase the distance between the at least two touch points in an up-down direction of the display unit, and may also increase the distance between the at least two touch points in a left-right direction of the display unit. Preferably, when it is detected that the movement or sliding operation for the at least two touch points by the user elongates the distance between the at least two touch points in the up-down direction of the display unit, the display unit is switched from displaying at the third region to displaying at the first region and the second region, in which the first region is located above or below the second region. In this way, the display unit is triggered to display in a up-down divi-screen mode. When it is detected that the movement or sliding operation for the at least two touch points by the user elongates the distance between the at least two touch points in the left-right direction of the display unit, the display unit is switched from displaying at the third region to displaying at the first region and the second region, in which the first region is located at a left or right side of the second region. In this way, the display unit is triggered to display in a left-right divi-screen mode. More preferably, when it is detected that the movement or sliding operation for the at least two touch points by the user elongates the distance between the at least two touch points, the display unit is preferably triggered to switch from displaying at the third region to displaying at the first region and the second region, in which the first region is located at the left or right side of the second region. That is, the display unit is preferably triggered to display in a left-right divi-screen mode. This is because that the method provided by the disclosure supports the user to turn the page through an up-down sliding gesture in the embodiment. In order to distinguish different operations, after the user triggers to display in the divi-screen mode, a sliding or movement input operation in the left-right direction is set as the first preset input operation, to determine the first object and the second object. One implementation way for setting a preset input operation as the first trigger instruction has been introduced above. Those skilled in the art may understand that other input operations may also be adopted as the first trigger instruction, as along as the input operation may be distinguished from the sliding or drag operation for turning the page.

In one embodiment, in order to satisfy various requirements of the user, the method provided by the embodiment of the disclosure not only supports a drag operation across pages, but also supports a drag operation for displaying in the divi-screen mode. When both the first object and the second object belong to the first part of the contact information set or display positions of the first object and the second object in the contact information set are close, the user can find the second object through a simple drag or sliding operation. Another possible case is that: when the first object or the second object does not belong to the first part of the contact information set or display positions of the first object and the second object in the contact information set are far, the display unit may be triggered to switch from displaying at the third region to displaying at the first region and the second region, thereby felicitating the user to operate.

In one embodiment, when the display unit of the first electronic device is switched from displaying at the third region to displaying at the first region and the second region, the first part of the contact information set is displayed at the first region, the second part of the contact information set is displayed at the second region, and the first part of the contact information set is the same as the second part of the contact information set. In this case, the content displayed in the first region and the second region is the same as that displayed in the third region.

Of course, when the display unit of the first electronic device is switched from displaying at the third region to displaying at the first region and the second region, the content displayed in the first region may be different from the content displayed in the second region. In this case, the contact information set includes at least a first subset and a second subset. The first subset is a first half part of the contact information set, i.e., the first subset includes the contact information whose display position is located at the front of the contact information set. The second subset is a latter half part of the contact information set, i.e., the second subset includes the contact information whose display position is located at the back of the contact information set. When the display unit of the first electronic device is switched from displaying at the third region to displaying at the first region and the second region, the first region displays the first part of the contact information set, the second region displays the second part of the contact information set, in which the first part of the contact information set is different from the second part of the contact information set. The first part of the contact information set belongs to the first subset, and the second part of the contact information set belongs to the second subset. In this way, the content displayed in the first region of the display unit is the same as the content displayed in the third region, but the content displayed in the second region of the display unit is different from the content displayed in the first region and the third region.

Further, the user may perform operations respectively for the first region and the second region. When a first sliding operation is detected at the first region of the display unit, a first control instruction is generated to control the first region to switch from displaying the first part of the contact information set to displaying a third part of the contact information set, where the first object is located in the third part of the contact information set. When a second sliding operation is detected at the second region of the display unit, a second control instruction is generated to control the second region to switch from displaying the second part of the contact information set to displaying a fourth part of the contact information set, where the second object is located in the fourth part of the contact information set.

In one embodiment, the display unit of the first electronic device displays a first navigation bar at the first region and displays a second navigation bar at the second region. The first navigation bar and the second navigation bar may display a set of letters. When the user clicks a letter in the set of letters, the display content may jump to display information or an application that begins with the letter. In this scenario, the operations respectively for the first region and the second region may includes: when a first touch operation for the first navigation bar is detected at the first region of the display unit, generating a third control instruction to control the first region to switch from displaying the first part of the contact information set to displaying a fifth part of the contact information set, in which the fifth part of the contact information set corresponds to the first touch operation for the first navigation bar and the first object is located in the fifth part of the contact information set; and when a second touch operation for the second navigation bar is detected at the second region of the display unit, generating a third control instruction to control the second region to switch from displaying the second part of the contact information set to displaying a sixth part of the contact information set, in which the sixth part of the contact information set corresponds to the second touch operation for the second navigation bar and the second object is located in the sixth part of the contact information set.

S302, detecting an input operation.

S303, when the input operation is a movement operation from the first region to the second region and the movement operation associates the first object with the second object, determining the input operation as a first preset input operation.

In one embodiment, the first preset input operation is a movement operation from the first region to the second region and the movement operation associates the first object with the second object. One possible implementation way includes: setting the first preset input operation as an operation that moves the first object from the first region to the second region. For example, the user selects a display object in the first region as the first object and performs an operation that moves the first object from the first region to the second region. The end position of the operation corresponds to the second object. In this way, the operation moves the first object to a position corresponding to the second object, to associate the first object with the second object. In this process, the input operation of the user is continuous, which corresponds to a continuous input trajectory. In this case, the display identifier for the first object is displayed to follow the continuous input trajectory from the beginning to the end. Another possible implementation way includes: performing an input operation through the user by performing a sliding operation for the first region and/or the second region when the display unit of the first electronic device display both the first object and the second object, and determining the input operation as a first preset input operation when the input operation connects the first object and the second object. In one embodiment, when the display unit of the first electronic device displays both the first object and the second object, the user may determine the first object and the second object through a connection operation. In this case, the user may perform a line connecting operation between the first object and the second object, and the first object does not move along with a trajectory of the line connecting operation. This line connecting operation of the user is used to determine the first object and the second object.

S304, acquiring a movement trajectory for the first preset input operation.

S305, acquiring a start position and an end position of the movement trajectory in the case that the movement trajectory is a continuous trajectory.

S306, determining a display object corresponding to the start position of the movement trajectory as a first object, and determining a display object corresponding to the end position of the movement trajectory as a second object.

S307, determining transmission information in accordance with the first information corresponding to the first object.

S308, determining a transmission parameter in accordance with the second contact information corresponding to the second object.

S309, transmitting the transmission information to a second electronic device by utilizing the determined transmission parameter.

In the third embodiment of the disclosure, the display unit of the first electronic device may be divided into a first region and a second region. At least the first object is displayed at the first region, and at least the second object is displayed at the second region. In an application scenario, the display unit of the first electronic device may display a part of the address book in two bars, and the content of the address book displayed at the first region may be the same as or different from that displayed at the second region. The user can conveniently search the first object and the second object by performing a sliding operation for the first object and/or a sliding operation for the second object respectively. When the first object and the second object are displayed on the display unit of the first electronic device simultaneously, the first object may be associated with the second object through a preset sliding operation, and the first object and the second object can be determined in accordance with the start position and the end position of the sliding operation. The transmission information and the transmission parameter are further generated automatically; and the transmission information is transmitted by utilizing the transmission parameter.

In the fourth and the fifth embodiments of the disclosure, the display unit of the electronic device includes a third region. The third region may display at least a first part of the contact information set. The first information corresponding to the first object is first contact information, and the display unit of the first electronic device displays the first object in the first part of the contact information set. When the second object is not located in the first part of the contact information set, there are different implementation ways for triggering a second part of the contact information set, which is described in detail below.

Figure 4:
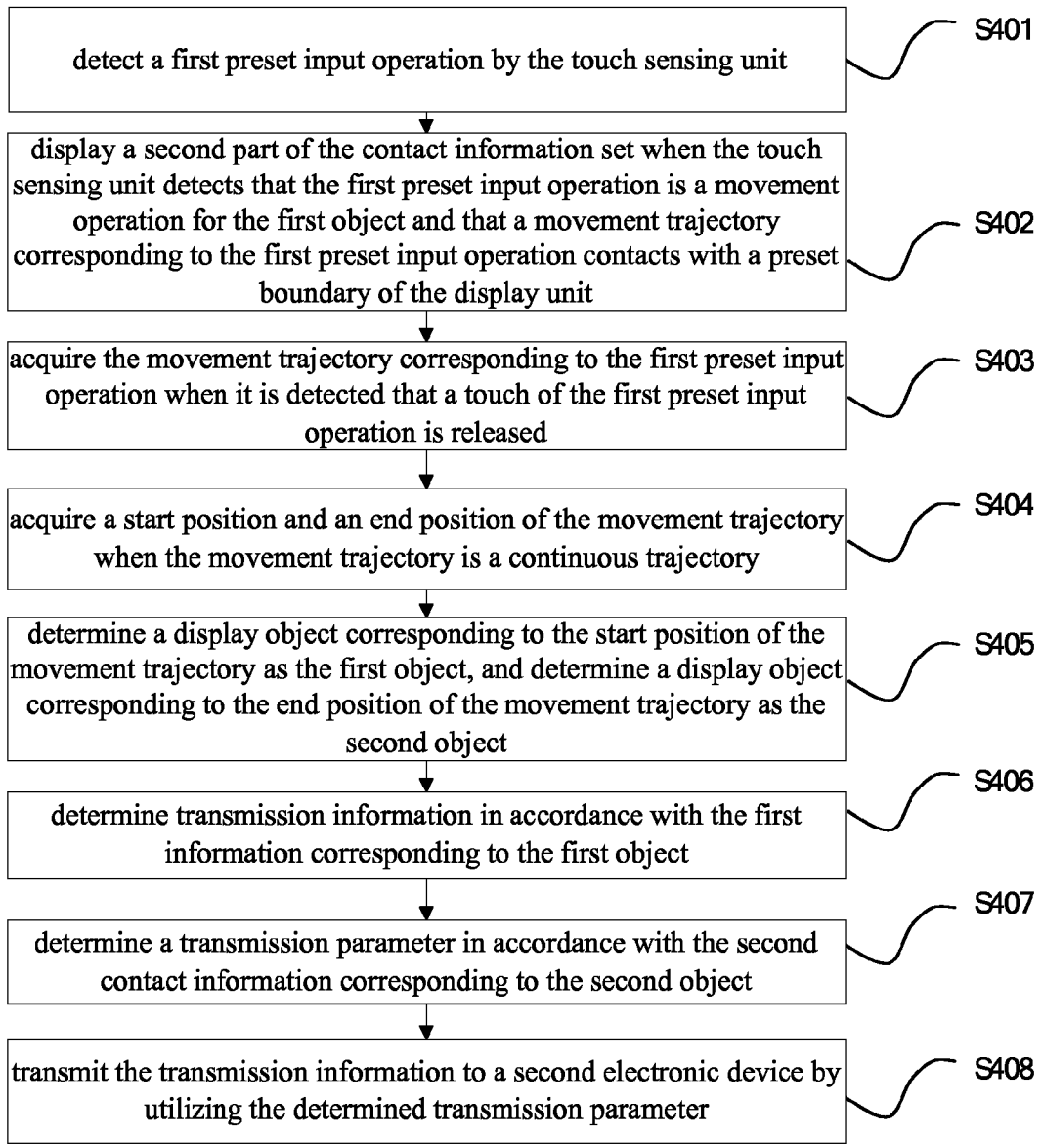
FIG. 4 is a schematic diagram of an information transmitting method according to a fourth embodiment of the disclosure.

Referring to FIG. 4, a flow chart of an information transmitting method according to a fourth embodiment of the disclosure is shown.

S401, detecting a first preset input operation by the touch sensing unit.

In this embodiment, the touch sensing unit displays in a single screen display mode, i.e., the touch sensing unit (the display unit) includes a third region, wherein the third region displays a first part of the contact information set, the first part of the contact information set includes a first object, and the first object corresponds to first contact information. Once an automatic transmitting function provided by the disclosure is triggered, the touch sensing unit detects a first preset input operation which is a continuous input operation, to determine the first object and a second object. Specifically, the automatic transmitting function provided by the disclosure may be triggered by a preset function key, and may also be triggered through a predetermined operation, such as a click operation, a sliding operation, a touch trigger operation with a pressure value larger than a preset pressure value and a continuous touch trigger operation with a duration time longer than a preset time. In addition, in the embodiment, the first object and the second object are also determined with a continuous input operation. In the process of inputting the first preset input operation by the user, when the second object is not located in the displayed first part of the contact information set, the user first selects the first object, and then triggers a replacement of display objects of the touch sensing unit by performing a downward or rightward sliding operation (i.e., the first preset input operation) on the first object. The user does not end the continuous input operation (the sliding operation) until the second object is displayed in the second part of the contact information set, and at last, a display object corresponding to the end position of the continuous input operation is determined as the second object.

S402, displaying a second part of the contact information set when the touch sensing unit detects that the first preset input operation is a movement operation for the first object and that a movement trajectory corresponding to the first preset input operation contacts with a preset boundary of the display unit.

In one embodiment, the preset boundary of the display unit may be a lower boundary or a right boundary of the display unit. When a movement trajectory corresponding to the first preset input operation is detected to contact with the preset boundary of the display unit, a second part of the contact information set is displayed. The second part of the contact information set is different from the first part of the contact information set, and the second part of the contact information set displays at least the second object.

S403, acquiring the movement trajectory corresponding to the first preset input operation when it is detected that a touch of the first preset input operation is released.

When the display unit of the first electronic device displays the second object in the second part of the contact information set, the user slides the first object to a position of the second object by continuing the first preset input operation, and then ends the first preset input operation. In this case, a touch corresponding to first preset input operation is released, and the movement trajectory corresponding to the first preset input operation is acquired.

S404, acquiring a start position and an end position of the movement trajectory when the movement trajectory is a continuous trajectory.

The start position and the end position of the movement trajectory corresponding to the first preset input operation are acquired.

S405, determining a display object corresponding to the start position of the movement trajectory as the first object, and determining a display object corresponding to the end position of the movement trajectory as the second object.

S406, determining transmission information in accordance with first information corresponding to the first object.

S407, determining a transmission parameter in accordance with second contact information corresponding to the second object.

S408, transmitting the transmission information to a second electronic device by utilizing the determined transmission parameter.

In the fourth embodiment of the disclosure, when the first object or the second object is not present in the first part of the contact information set, based on one preset input operation, the switching of the display content of the contact information set may be triggered and the first object and the second object may be determined. Specifically, when the movement trajectory corresponding to the first preset input operation is detected to contact with a preset boundary of the display unit, the switching of the display content of the display unit is triggered to display the second part of the contact information set. In the fourth embodiment of the disclosure, the switching of the display content of the display unit may be triggered conveniently, and the automatic transmission of the information may be implemented through a simple operation.

The fifth embodiment of the disclosure differs from the fourth embodiment of the disclosure in that, the switching of the display content of the display unit may be triggered by detecting a third operation.

Similar to the fourth embodiment of the disclosure, the display unit of the first electronic device includes a third region in the fifth embodiment of the disclosure. The third region displays at least a first part of the contact information set. The first information corresponding to the first object is first contact information. The display unit of the first electronic device displays the first object in the first part of the contact information set. When the second object is not located in the first part of the contact information set, the displaying of a second part of the contact information set is triggered by detecting a third operation, which is described in detail below.

Figure 5:
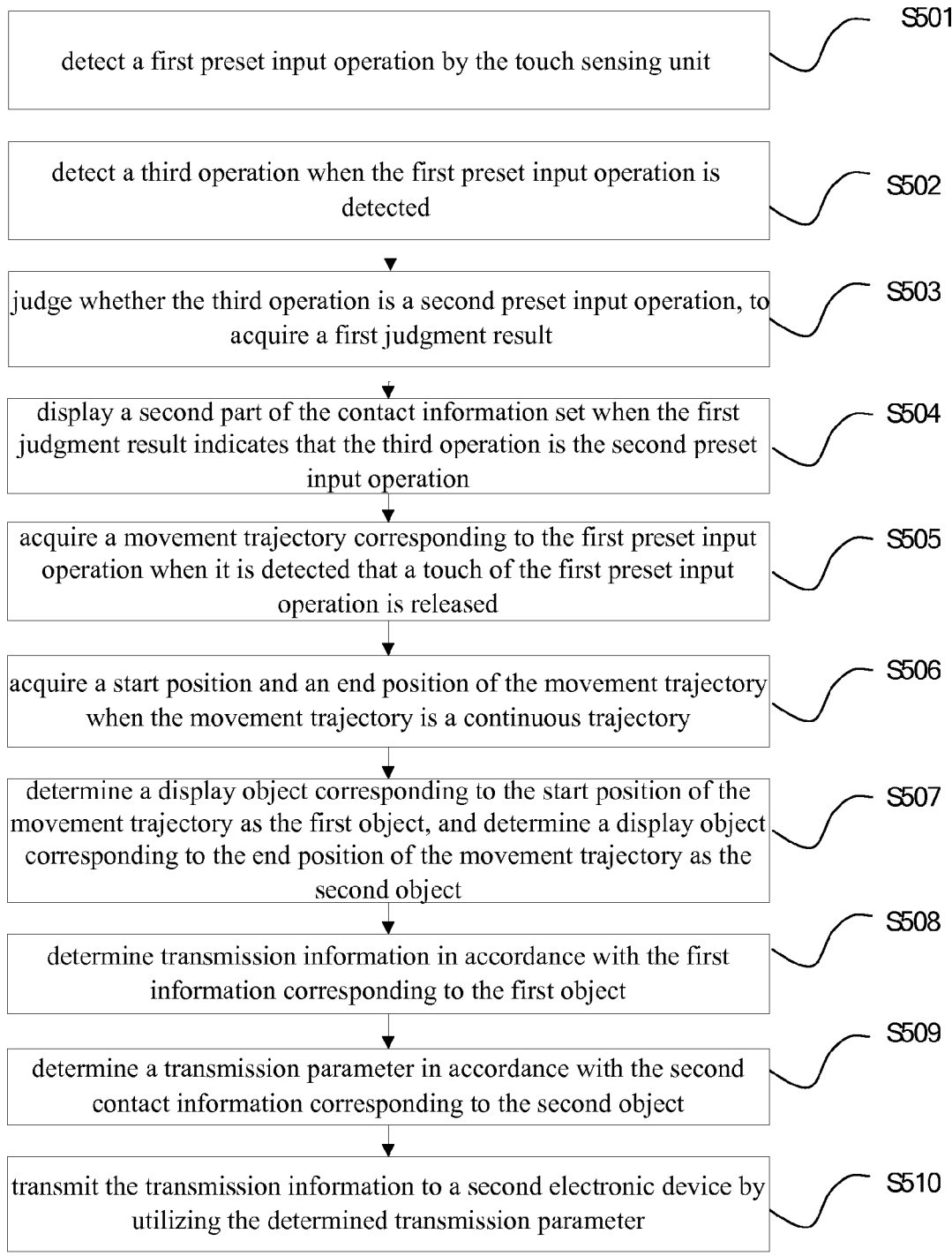
FIG. 5 is a schematic diagram of an information transmitting method according to a fifth embodiment of the disclosure.

Referring to FIG. 5, a flow chart of an information transmitting method according to a fifth embodiment of the disclosure is shown.

S501, detecting a first preset input operation by the touch sensing unit.

In the embodiment, the touch sensing unit displays in a single screen display mode. That is, the touch sensing unit (the display unit) includes a third region, the third region displays a first part of the contact information set, the first part of the contact information set includes a first object, and the first object corresponds to first contact information. After an automatic transmitting function provided by the disclosure is triggered, the touch sensing unit detects a first preset input operation which is a continuous input operation, to determine the first object and the second object. In one embodiment, the first preset input operation includes at least a first operation. The first operation may be a selection operation for the first object. Preferably, the first preset input operation includes a first operation and a second operation. The first operation may be a selection operation for the first object, which is performed continuously. The second operation may be a movement operation for the first object.

S502, detecting a third operation when the first operation is detected.

S503, judging whether the third operation is a second preset input operation, and acquiring a first judgment result.

Specifically, the second preset input operation is a sliding operation for the first region of the display unit, which is used to switch the display content of the display unit. In the process of the third operation, the first operation is in a continuing state.

S504, displaying a second part of the contact information set when the first judgment result indicates that the third operation is the second preset input operation.

When it is judged that the third operation is the second preset input operation, a second part of the contact information set is displayed. The second part of the contact information set is different from the first part of the contact information set. The second part of the contact information set displays at least the second object.

S505, acquiring a movement trajectory corresponding to the first preset input operation when it is detected that a touch of the first preset input operation is released.

When the display unit of the first electronic device displays the second object in the second part of the contact information set, the user slides the first object to a position of the second object through the second operation, and then ends the first preset input operation. At this time, a touch corresponding to first preset input operation is released, and a movement trajectory corresponding to the first preset input operation is acquired.

S506, acquiring a start position and an end position of the movement trajectory when the movement trajectory is a continuous trajectory.

Specifically, a start position and an end position of the movement trajectory corresponding to the first preset input operation are acquired.

S507, determining a display object corresponding to the start position of the movement trajectory as the first object, and determining a display object corresponding to the end position of the movement trajectory as the second object.

S508, determining transmission information in accordance with first information corresponding to the first object.

S509, determining a transmission parameter in accordance with second contact information corresponding to the second object.

S510, transmitting the transmission information to a second electronic device by utilizing the determined transmission parameter.

In the following, an application scenario of the fifth embodiment is described. The display unit of the first electronic device firstly displays a first part of the contact information set, and the first object is in the first part of the contact information set. When the second object is not in the first part of the contact information set, the user may select the first object with his left hand, and the selection operation is in a continuing state. For example, the user may long press a position of the first object. In this case, the left hand of the user keeps long pressing without releasing. In this case, the user may slide the address book (i.e., the contact information set) with his right hand. When the touch sensing unit detects the sliding operation by the right hand of the user, the switching of the display content of the display unit is triggered. At this time, a second part of the contact information set is displayed, and the second object is in the second part of the contact information set. In the above process, when the user long presses the position of the first object with his left hand, a display identifier corresponding to the first object may be in a suspension state. When the first object and the second object appear at the current display interface of the display unit simultaneously, the second object may be determined by performing the second operation, i.e., an operation that moves the first object to a position of the second object, with the user's left hand. An implementation way for determining a second object may include: acquiring a movement trajectory of the second operation, determine an end position of the movement trajectory, and determine a display object corresponding to the end position of the movement trajectory as the second object.

In the fifth embodiment of the disclosure, when the first object or the second object are not in the first part of the contact information set, the switching of the display content of the contact information set may be triggered by detecting the third operation, and the first object and the second object can be determined through a preset continuous input operation. In the fifth embodiment of the disclosure, the switching of the display content of the display unit may be triggered conveniently, and the automatic transmission of the information may be implemented through a simple operation.

Figure 6:
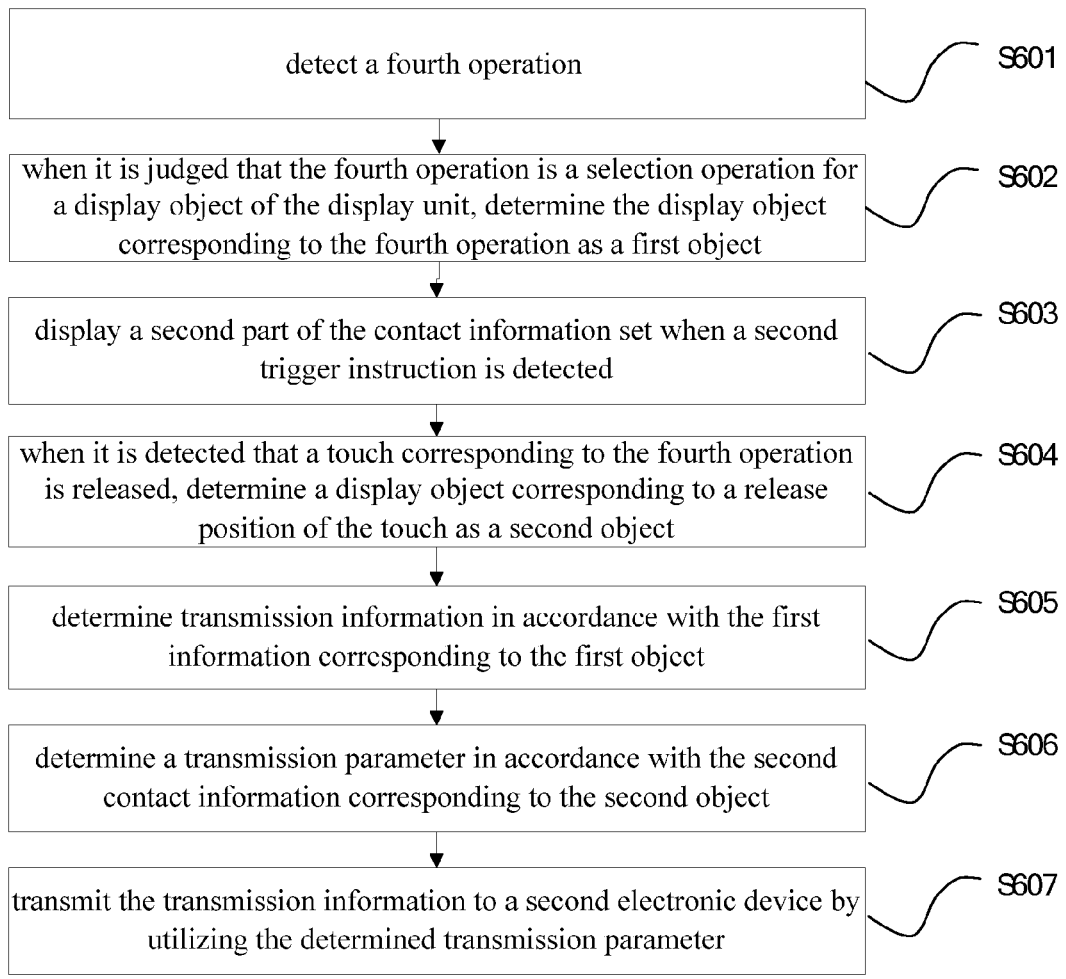
FIG. 6 is a schematic diagram of an information transmitting method according to a sixth embodiment of the disclosure.

Referring to FIG. 6, a flow chart of an information transmitting method according to a sixth embodiment of the disclosure is shown.

In the embodiment, a first object and a second object are determined through one operation which is a discontinuous input operation. The first information corresponding to the first object is first contact information, and the display unit of the first electronic device displays the first object in a first part of the contact information set.

S601, detecting a fourth operation.

S602, when it is judged that the fourth operation is a selection operation for a display object of the display unit, determining the display object corresponding to the fourth operation as a first object.

In the embodiment, the fourth operation is a selection operation corresponding to the first object and the selection operation is performed continuously.

S603, displaying a second part of the contact information set when a second trigger instruction is detected.

Specifically, the second trigger instruction is adapted to trigger to display a second part of the contact information set when a preset sliding operation is detected or when it is judged that the duration time of the fourth operation is longer than a first preset time. The second part of the contact information set is different from the first part of the contact information set, and the second part of the contact information set displays at least the second object.

S604, when it is detected that a touch corresponding to the fourth operation is released, determining a display object corresponding to a release position of the touch as a second object.

When the display unit of the first electronic device displays the second object in the second part of the contact information set, the user may release the fourth operation. At this time, the touch corresponding to the fourth operation is released, and the display object corresponding to a release position of the touch is determined as the second object.

S605, determining transmission information in accordance with first information corresponding to the first object.

S606, determining a transmission parameter in accordance with second contact information corresponding to the second object.

S607, transmitting the transmission information to a second electronic device by utilizing the determined transmission parameter.

In the sixth embodiment of the disclosure, the user may determine the first object and the second object with one operation. The fourth operation is a "long press" operation for a display object. In this case, the switching of a display object of the display unit can be triggered in accordance with the operation or other preset operations. When the touch corresponding to the fourth operation is released, the display object corresponding to the release position is determined as the second object. In the embodiment, the user may determine the first object and the second object by a simple operation, the transmission information and the transmission parameter are automatically generated, and the automatic transmission of the transmission information is implemented. Therefore, the operation is convenient for the user to use.

Figure 7:
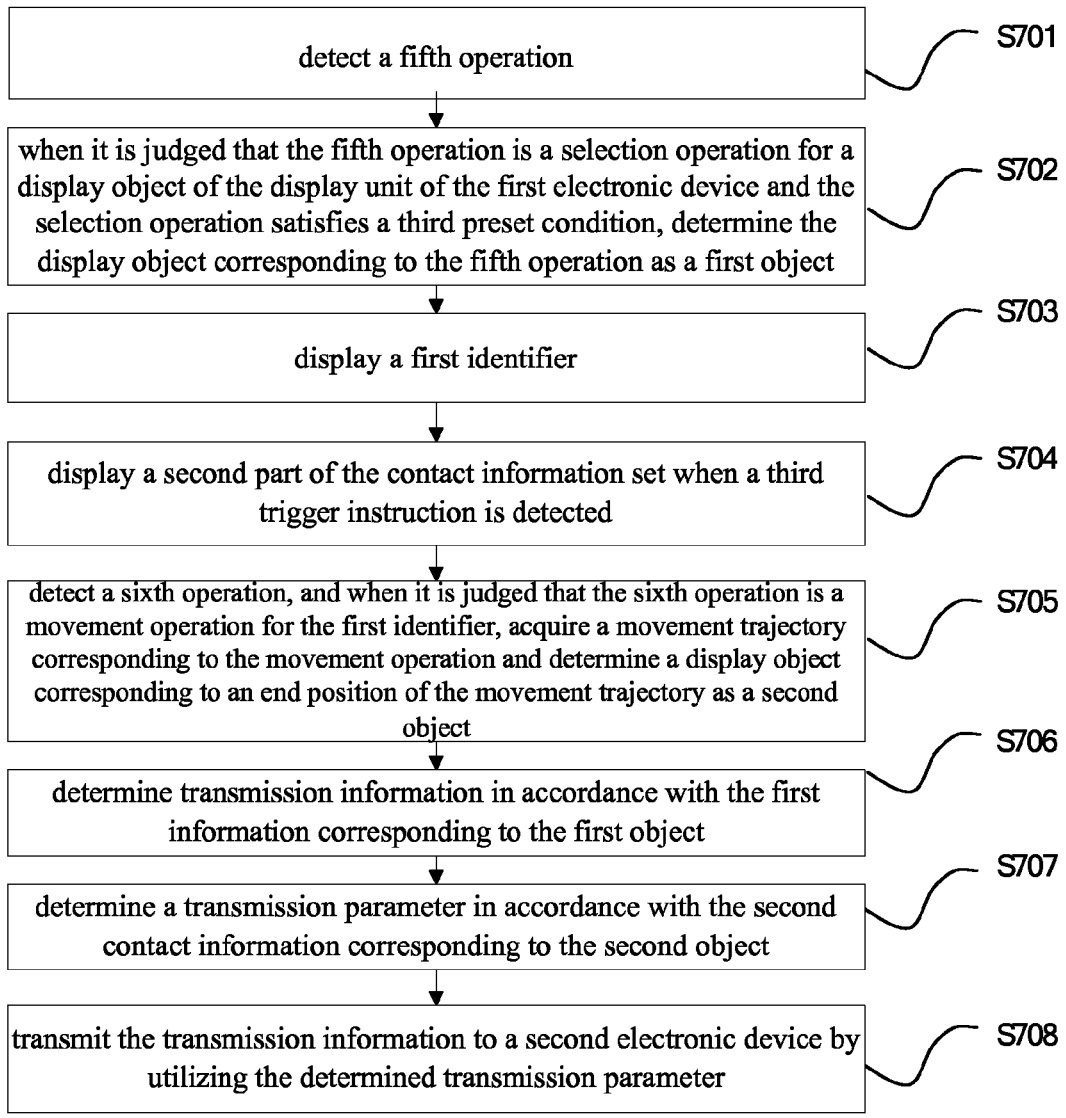
FIG. 7 is a schematic diagram of an information transmitting method according to a seventh embodiment of the disclosure.

Referring to FIG. 7, a flow chart of an information transmitting method according to a seventh embodiment of the disclosure is shown.

S701, detecting a fifth operation.

S702, when it is judged that the fifth operation is a selection operation for a display object of the display unit of the first electronic device and the selection operation satisfies a third preset condition, determining the display object corresponding to the fifth operation as a first object.

The fifth operation satisfying a third preset condition may include any of the following cases:

(1) the fifth operation is a double-click operation for the first object;

(2) the fifth operation is a selection operation for the first object, and the duration time of the selection operation is longer than a first preset time;

(3) the fifth operation is a touch operation, and a pressure value of the touch operation is larger than a first preset threshold; and (4) the fifth operation is a touch pen operation and a sixth operation is an input gesture operation; or the fifth operation is an input gesture operation and a sixth operation is a touch-pen operation. The input mode of the fifth operation is different from the input mode of the sixth operation, as long as the fifth operation may be distinguished from the sixth operation.

When it is detected that the fifth operation satisfies the third preset condition, the display object corresponding to the fifth operation is determined as the first object.

S703, displaying a first identifier.

The first identifier corresponds to the first object, and the first identifier. The first identifier is superposed with the display object of the display unit of the first electronic device to display. In one embodiment, the first identifier may be a suspended identifier. For example, the user selects the first contact information corresponding to the first object, and the display identifier of the first object on the display unit is "San Zhang". In this case, the identifier "San Zhang" is displayed in suspension. When the display unit switches the display content, the identifier "San Zhang" is still displayed in suspension at a position on the display unit where it is originally displayed, and a display object at the next layer of the identifier "San Zhang" is changed.

S704, displaying a second part of the contact information set when a third trigger instruction is detected.

In one embodiment, when the third trigger instruction is a preset sliding operation, or when the fifth operation is detected, the display of a second part of the contact information set is triggered. The second part of the contact information set is different from the first part of the contact information set, and the second part of the contact information set displays at least a second object.

S705, detecting a sixth operation; when it is judged that the sixth operation is a movement operation for the first identifier, acquiring a movement trajectory of the movement operation; and determining a display object corresponding to an end position of the movement trajectory as a second object.

After the display unit displays the second part, a sixth operation is detected. The sixth operation is a movement operation for the first identifier. The display object corresponding to the end position of the movement operation is determined as the second object.

S706, determining transmission information in accordance with first information corresponding to the first object.

S707, determining a transmission parameter in accordance with second contact information corresponding to the second object.

S708, transmitting the transmission information to a second electronic device by utilizing the determined transmission parameter.

In the seventh embodiment of the disclosure, after the user selects the first object with the fifth operation, the identifier of the first object is displayed in suspension, and the switching of the display content of the display unit is triggered through the third trigger instruction. When the display unit displays the second object in the second part of the contact information set, the sixth operation is detected. The sixth operation is a movement operation for the first identifier. The display object corresponding to the end position of the movement operation is determined as the second object. In this embodiment, various operations may be conveniently completed by the user with one hand, thereby making the operation simple.

Figure 8:
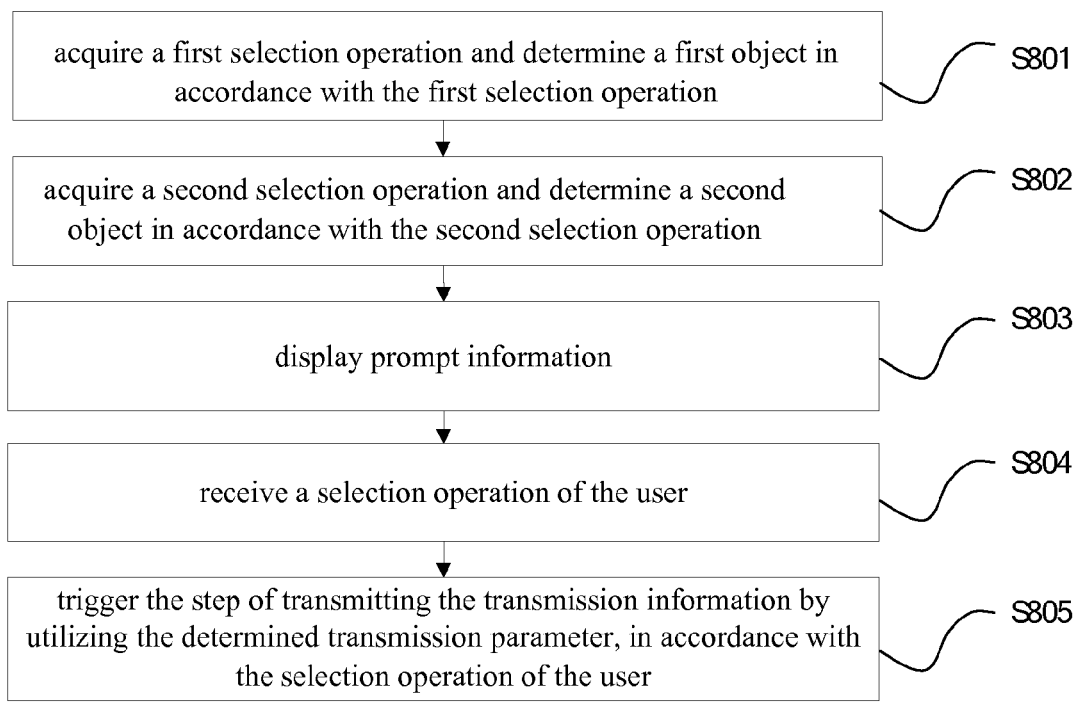
FIG. 8 is a schematic diagram of an information transmitting method according to an eighth embodiment of the disclosure.

Referring to FIG. 8, a flow chart of an information transmitting method according to an eighth embodiment of the disclosure is shown.

In the embodiment, the first object and the second object are determined in accordance with a time sequence of a first selection operation and a second selection operation.

S801, acquiring a first selection operation and determining a first object in accordance with the first selection operation.

The first selection operation may be: (1) a double-click operation for the first object; (2) a selection operation for the first object, and a duration time of the selection operation is longer than a first preset time; or (3) a touch operation, and a pressure value of the touch operation is larger than a first preset threshold. Alternatively, the first selection operation may be a touch pen operation and the second selection operation may be an input gesture operation, or the first selection operation is an input gesture operation and the second selection operation is a touch pen operation. The input mode of the first selection operation is different from the input mode of the second selection operation, as long as the first selection operation may be distinguished from the second selection operation.

S802, acquiring the second selection operation and determining a second object in accordance with the second selection operation.

The first selection operation happens before the second selection operation. In one embodiment, other selection operations may also be included to determine other objects. That is, the first object may include multiple selection objects, and the second object may also include multiple selection objects. How to distinguish the selection objects between the first object to the second object may be set in accordance with specific scenarios and acquirements. The implementation ways obtained by those skilled in the art without any creative work are within the scope of protection of the disclosure.

S803, displaying prompt information.

After the first selection operation and the second selection operation are detected, the prompt information may be displayed to prompt the user to confirm whether an operation of transmitting information is performed.

S804, receiving a selection operation of the user.

S805, triggering the step of transmitting the transmission information by utilizing the determined transmission parameter, in accordance with the selection operation of the user.

When the received selection operation of the user indicates to perform the operation of transmitting information, transmission information is determined in accordance with first information corresponding to the first object, a transmission parameter is determined in accordance with second contact information corresponding to the second object, and the transmission information is transmitted to a second electronic device by utilizing the determined transmission parameter.

The eighth embodiment of the disclosure differs from the above embodiments in that, the first object and the second object are determined in accordance with the time sequence that the first selection operation for the first object and the second selection operation for the second operation happen. In this embodiment, the first object and the second object may be or may not be displayed on the display unit of the first electronic device simultaneously, making the user's operation very flexible.

Figure 9:
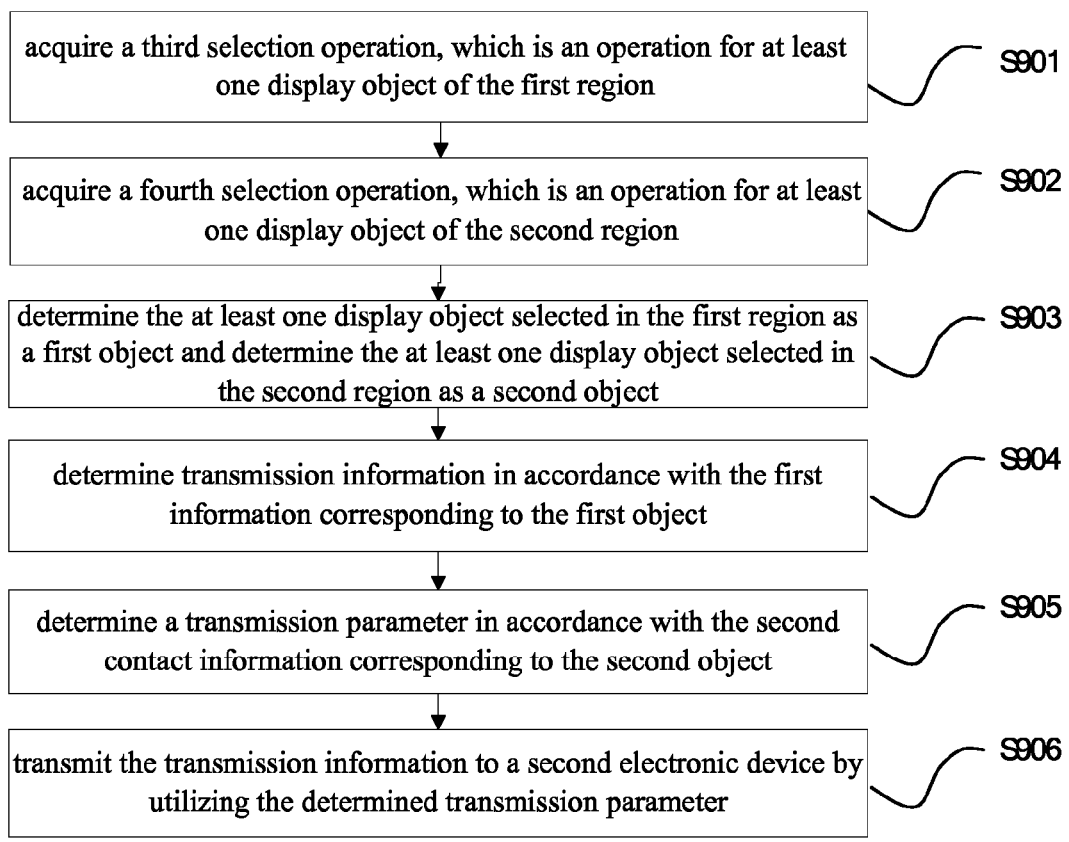
FIG. 9 is a schematic diagram of an information transmitting method according to a ninth embodiment of the disclosure.

Referring to FIG. 9, a flow chart of an information transmitting method according to a ninth embodiment of the disclosure is shown.

In the ninth embodiment of the disclosure, the display unit includes a first region and a second region. The display content of the first region is the same as or different from that of the second region. The user may preset an object selected in the first region as the first object, and then transmission information is generated in accordance with the first object; and preset an object selected in the second region as the second object, and then a transmission parameter is determined in accordance with the second object; and vice versa.

S901, acquiring a third selection operation, where the third selection operation is an operation for at least one display object in the first region.

The third selection operation may select one or more objects.

S902, acquiring a fourth selection operation, where the fourth selection operation is an operation for at least one display object in the second region.

The fourth selection operation may select one or more objects.

S903, determining the at least one display object selected in the first region as a first object and determining the at least one display object selected in the second region as a second object.

In this embodiment, the first region of the display unit of the first electronic device displays a second identifier, and the second region of the display unit displays a third identifier. The at least one display object selected in the first region is determined as the first object and the at least one display object selected in the second region is determined as the second object. The step of determining the first object and the second object may include:

performing a sliding operation on the first region and the second region respectively in accordance with an operation of a user; and determining a display object superposed with the second identifier as the first object, and determining a display object superposed with the third identifier as the second object.

In one embodiment, the first identifier and the second identifier may be transparent windows, highlighted identification strips or suspended windows, which is adapted to select the first object and the second object by the user. The specific forms of the first identifier and the second identifier are not defined in the disclosure.

S904, determining transmission information in accordance with first information corresponding to the first object.

S905, determining a transmission parameter in accordance with second contact information corresponding to the second object.

S906, transmitting the transmission information to a second electronic device by utilizing the determined transmission parameter.

In the ninth embodiment of the disclosure, in accordance with the different regions where the selection objects are located, the selection object, the information of which is used generate the transmission information, is determined; and the selection object, the information of which is used to generate the transmission parameter, is determined. The automatic transmission of the transmission information is implemented by utilizing the transmission parameter. Further, multiple pieces of transmission information may be transmitted to addresses or terminals corresponding to multiple transmission parameters.

Figure 10:
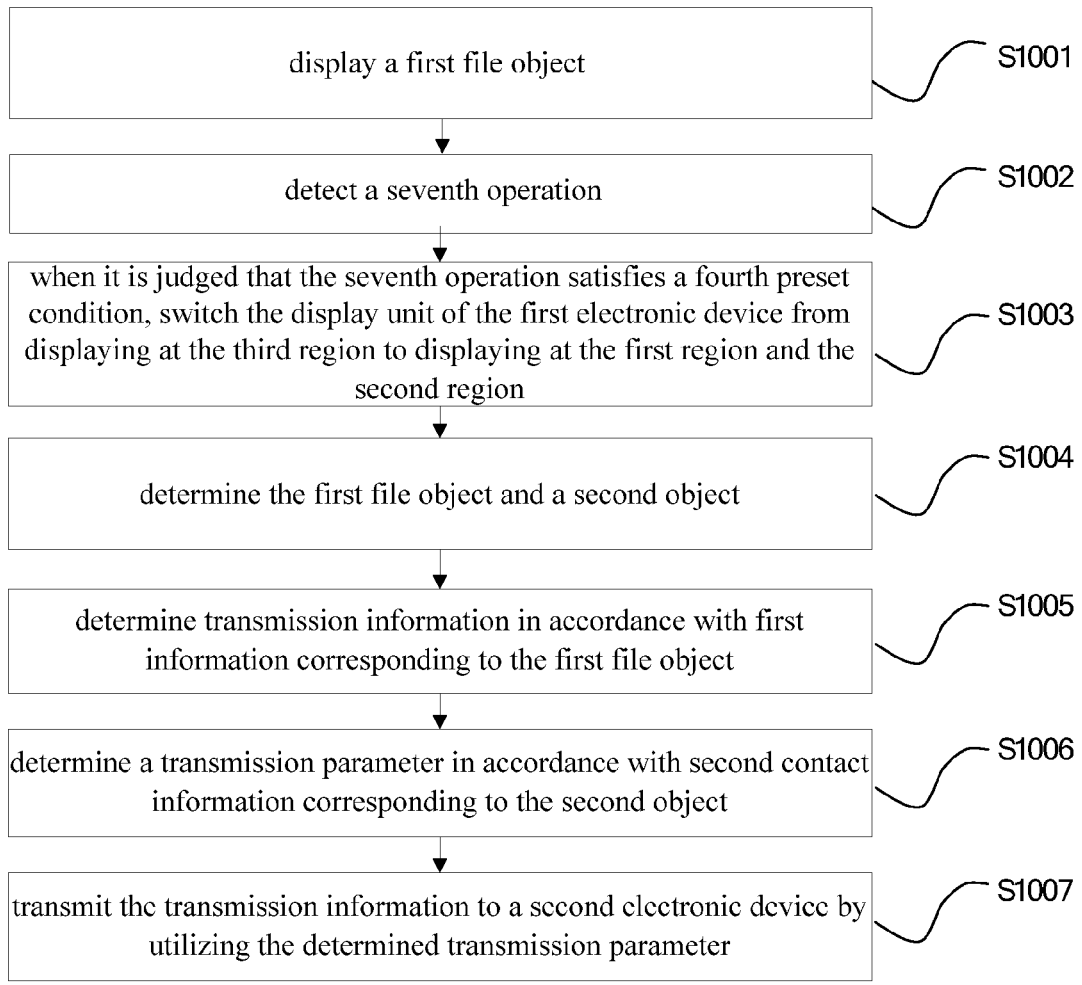
FIG. 10 is a schematic diagram of an information transmitting method according to a tenth embodiment of the disclosure.

Referring to FIG. 10, a flow chart of an information transmitting method according to a tenth embodiment of the disclosure is shown.

In the embodiments mentioned above, it is illustrated by taking a case that both the first object and the second object correspond to the contact information as an example. Those skilled in the art may understand that the above embodiments may also be applied in a scenario that the first object does not correspond to the contact information. In the following, the method provided by the disclosure is illustrated by taking a case that the first object corresponds to file data as an example. This is just exemplary description, and modifications and variations obtained by those skilled in the art without any creative work are within the scope of protection of the disclosure.

S1001, displaying a first file object.

In the tenth embodiment of the disclosure, the display unit of the first electronic device displays at least a first file object at a third region. The first file object may correspond to a file or a folder, and the first file object may also correspond to first data.

S1002, detecting a seventh operation.

S1003, when the seventh operation is judged to satisfy a fourth preset condition, switching the display unit of the first electronic device from displaying at the third region to displaying at the first region and the second region.

In one embodiment, the seventh operation may be an operation for triggering a function key, or a preset input operation. When the seventh operation is detected, the display unit of the first electronic device is switched from displaying at the third region to displaying at the first region and the second region. Before the seventh operation is detected, the display unit displays at least the first file object at the third region. After the seventh operation is detected, the display content of the display unit at the first region is the same as the display content at the third region, that is, at least the first file object is displayed. The display unit displays a first part of the contact information set at the second region. When the second object does not belong to the first part of the contact information set, the display unit may be switched to display a second part of the contact information set by detecting a sliding operation of the user. The second part of the contact information set displays at least the second object which corresponds to second contact information.

S1004, determining the first file object and a second object.

The first file object and the second object are determined when the display unit of the first electronic device displays the first file object and the second object simultaneously. In one embodiment, the way for determining the first file object and the second object may be any one of the implementation ways described in the first embodiment to the ninth embodiment of the disclosure, which is not defined here.

S1005, acquiring first data in accordance with the first file object, and generating transmission information in accordance with the first data.

S1006, determining a transmission parameter in accordance with the determined second object.

S1007, transmitting the transmission information to a second electronic device by utilizing the determined transmission parameter.

In the ninth embodiment of the disclosure, an application scenario that the first object does not correspond to the first contact information is described. In particular, when the first object is a first file object, the first file object and the second object may be determined in accordance with a user's operation, the first data corresponding to the first file object may be determined as the transmission content, the contact information corresponding to the second object can be determined as the transmission parameter, and the automatic transmission of the transmission information may be implemented. Those skilled in the art may understand that the above description only takes the file data as an example, and the method provided by the disclosure may also be applied in other scenarios.

Figure 11:
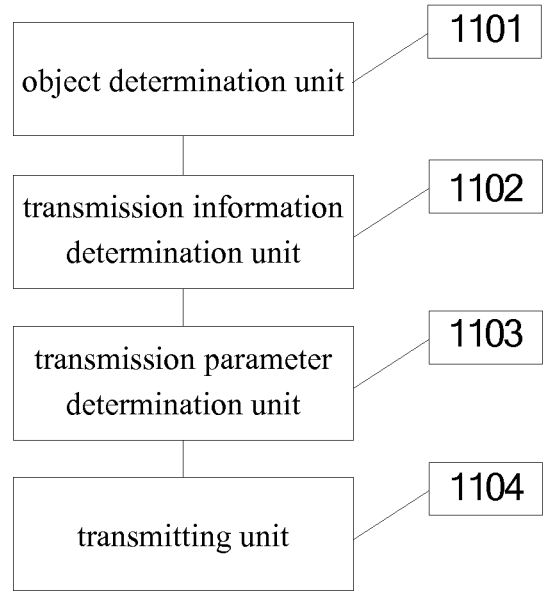
FIG. 11 is a schematic diagram of a first electronic device according to an embodiment of the disclosure.

Referring to FIG. 11, a schematic diagram of a first electronic device according to an embodiment of the disclosure is shown.

A first electronic device includes: an object determination unit 1101, a transmission information determination unit 1102, a transmission parameter determination unit 1103 and a transmitting unit 1104.

The object determination unit 1101 is adapted to determine a first object and a second object in the case that the first electronic device stores at least one piece of contact information in a contact information set, wherein the first object is determined after a display unit of the first electronic device displays the first object, the second object is determined after the display unit of the first electronic device displays at least a first part of the contact information set, the first object corresponds to first information, the second object corresponds to second information, and the second information is second contact information.

The transmission information determination unit 1102 is adapted to determine transmission information in accordance with the first information corresponding to the first object.

The transmission parameter determination unit 1103 is adapted to determine a transmission parameter in accordance with the second contact information corresponding to the second object.

The transmitting unit 1104 is adapted to transmit the transmission information to a second electronic device by utilizing the determined transmission parameter.

Preferably, the display unit of the first electronic device is a touch sensing unit, and the object determination unit is adapted to detect a first preset input operation and determine a first object and a second object in accordance with the first preset input operation by utilizing the touch sensing unit. The first preset input operation is a continuous input operation.

Preferably, the object determination unit includes: a first detection unit, a first acquisition unit, a second acquisition unit and a determination unit.

The first detection unit is adapted to detect a first preset input operation by utilizing the touch sensing unit.

The first acquisition unit is adapted to acquire a movement trajectory corresponding to the first preset input operation.

The second acquisition unit is adapted to acquire a start position and an end position of the movement trajectory when the movement trajectory is a continuous trajectory.

The determination unit is adapted to determine a display object corresponding to the start position of the movement trajectory as a first object, and determine a display object corresponding to the end position of the movement trajectory as a second object.

Preferably, the first information corresponding to the first object is first contact information, and the display unit of the first electronic device displays the first object in a first part of the contact information set.

The display unit of the first electronic device is further adapted to: display a second part of the contact information set when the touch sensing unit detects that the first preset input operation is a movement operation for the first object and when it is detected that the movement trajectory corresponding to the first preset input operation contacts with a preset boundary of the display unit. The second part of the contact information set is different from the first part of the contact information set, and the second part of the contact information set displays at least the second object.

Preferably, the first information corresponding to the first object is first contact information, the display unit of the first electronic device displays the first object in the first part of the contact information set. The first preset input operation includes at least a first operation, which is a selection operation for the first object. The first electronic device further includes: a third detection unit and a first judging unit.

The third detection unit is adapted to detect a third operation when the first operation is detected.

The first judging unit is adapted to judge whether the third operation is a second preset input operation, to acquire a first judgment result.

The display unit is further adapted to display a second part of the contact information set when the first judgment result indicates that the third operation is the second preset input operation. The second part of the contact information set is different from the first part of the contact information set, and the second part of the contact information set displays at least the second object.

Preferably, the first preset input operation includes a first operation and a second operation. The first operation is a selection operation for the first object which is performed continuously. The second operation is a movement operation for the first object.

The object determination unit is further adapted to acquire a movement trajectory corresponding to the second operation, determine an end position of the movement trajectory, and determine a display object corresponding to the end position of the movement trajectory as a second object.

Preferably, the display unit of the first electronic device is divided into a first region and a second region. The first region displays at least the first object, and the second region displays at least the second object.

The first detection unit is further adapted to detect an input operation; and when the input operation is a movement operation from the first region to the second region and the movement operation associates the first object with the second object, determine the input operation as a first preset input operation.

Preferably, the display unit of the first electronic device includes a third region adapted to display the first part of the contact information set. An area of the third region is larger than an area of the first region and an area of the second region.

The display unit of the first electronic device is further adapted to switch from displaying at the third region to displaying at the first region and the second region after a first trigger instruction is detected.

Preferably, the first region displays a first part of the contact information set, and the second region displays a second part of the contact information set. The first part of the contact information set is the same as or different from the second part of the contact information set.

Preferably, the first electronic device further includes: a first control unit and a second control unit.

The first control unit is adapted to generate, when a first sliding operation is detected at the first region of the display unit, a first control instruction to control the first region to switch from displaying the first part of the contact information set to displaying a third part of the contact information set. The first object is located in the third part of the contact information set.

The second control unit is adapted to generate, when a second sliding operation is detected at the second region of the display unit, a second control instruction to control the second region to switch from displaying the second part of the contact information set to displaying a fourth part of the contact information set. The second object is located in the fourth part of the contact information set.

Preferably, the first information corresponding to the first object is first contact information, the display unit of the first electronic device displays the first object in a first part of the contact information set. The first electronic device further includes: a fourth detection unit and a fifth detection unit.

The fourth detection unit is adapted to detect a fourth operation.

The object determination unit is further adapted to determine the display object corresponding to the fourth operation as the first object when it is judged that the fourth operation is a selection operation for a display object of the display unit.

The fifth detection unit is adapted to detect a second trigger instruction.

The display unit is further adapted to display a second part of the contact information set in the case that a second trigger instruction is detected. The second part of the contact information set is different from the first part of the contact information set, and the second part of the contact information set displays at least a second object.

The object determination unit is further adapted to determine a display object corresponding to a release position of a touch as the second object, when it is detected that the touch corresponding to the fourth operation is released.

Preferably, the first information corresponding to the first object is first contact information, and the display unit of the first electronic device displays the first object in a first part of the contact information set. The first electronic device further includes a sixth detection unit and a seventh detection unit.

The sixth detection unit is adapted to detect a fifth operation.

The object determination unit is further adapted to determine the display object corresponding to the fifth operation as the first object, when it is judged that the fifth operation is a selection operation for a display object of the display unit of the first electronic device and the selection operation satisfies a third preset condition.

The display unit is further adapted to display a first identifier. The first identifier corresponds to the first object, and the first identifier is superposed with a display object of the display unit of the first electronic device to display The display unit is further adapted to display a second part of the contact information set when a third trigger instruction is detected. The second part of the contact information set is different from the first part of the contact information set, and the second part of the contact information set displays at least a second object.

The seventh detection unit is adapted to detect a sixth operation.

The object determination unit is further adapted to, when it is judged that the sixth operation is a movement operation for the first identifier, acquire a movement trajectory corresponding the movement operation and determine a display object corresponding to an end position of the movement trajectory as the second object.

Preferably, the object determination unit further includes: a third acquisition unit and a fourth acquisition unit.

The third acquisition unit is adapted to acquire a first selection operation and determine a first object in accordance with the first selection operation; and The fourth acquisition unit is adapted to acquire a second selection operation and determine a second object in accordance with the second selection operation. The first selection operation happens before the second selection operation.

Preferably, the display unit of the first electronic device includes a first region and a second region, and the object determination unit includes: a fifth acquisition unit, a sixth acquisition unit and a second determination unit.

The fifth acquisition unit is adapted to acquire a third selection operation, which is an operation for at least one display object of the first region.

The sixth acquisition unit is adapted to acquire a fourth selection operation, which is an operation for at least one display object of the second region.

The second determination unit is adapted to determine the at least one display object selected in the first region as the first object and determine the at least one display object selected in the second region as the second object.

Preferably, the first region of the display unit displays a second identifier, the second region of the display unit displays a third identifier, and the second determination unit is further adapted to slide the first region and the second region respectively in accordance with an operation of a user, determine a display object superposed with the second identifier as a first object, and determine a display object superposed with the third identifier as a second object.

Preferably, the object determination unit is adapted to determine the first object and the second object when the display unit of the first electronic device displays the first object and the second object simultaneously.

The transmitting unit is adapted to select, by utilizing the determined transmission parameter, a transmission application corresponding to the transmission parameter, to transmit the transmission information.

Figure 12:
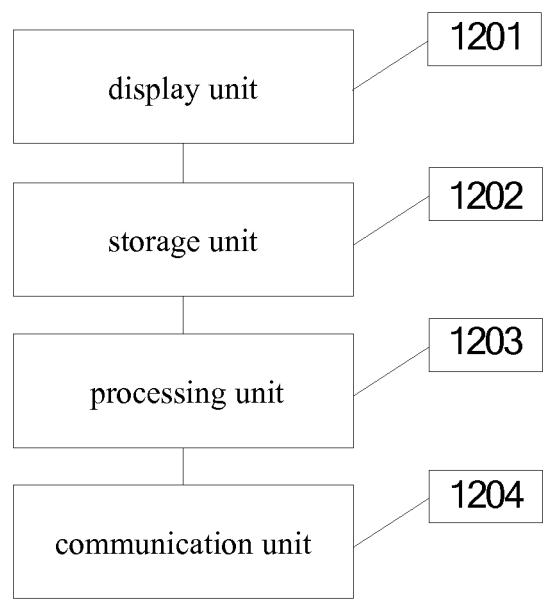
FIG. 12 is a schematic diagram of a first terminal according to an embodiment of the disclosure.

Referring to FIG. 12, a schematic diagram of a first terminal according to an embodiment of the disclosure is shown.

A first terminal includes a display unit 1201, and the first terminal further includes: a storage unit 1202 and a processing unit 1203.

The storage unit 1202 is adapted to store at least one piece of contact information in a contact information set.

The processing unit 1203 is adapted to determine a first object and a second object, where the first object is determined after a display unit of the first terminal displays the first object, the second object is determined after the display unit of the first terminal displays at least a first part of the contact information set, the first object corresponds to first information, the second object corresponds to second information, and the second information is second contact information. The processing unit 1203 is further adapted to determine transmission information in accordance with the first information corresponding to the first object and determine a transmission parameter in accordance with the second contact information corresponding to the second object.

The communication unit 1204 is adapted to transmit the transmission information to a second electronic device by utilizing the determined transmission parameter.

In one embodiment, the functions of the first electronic device shown in the eleventh embodiment of the disclosure may be implemented by the first terminal provided by the disclosure. Those skilled in the art may implement the functions and construction of the first terminal of the disclosure with reference to the content of the method embodiments and the content of the apparatus embodiments of the disclosure described above.

It should be noted that, relational terms, such as first and second, herein are just used to distinguish one entity or operation from another entity or operation, which do not necessarily require or indicate that any of such actual relationship or sequence exists between these entities or operations. In addition, terms "comprise", "include" or any other variation thereof intends to be understood in a nonexclusive sense, so that a process, a method, an object or a device including a series of elements not only includes these elements, but also includes other elements not explicitly listed, or further includes elements inherent in the process, the method, the object or the device. In the absence of more restrictions, element defined by a sentence "includes a . . . " does not exclude that other same elements also exist in the process, the method, the object or the device including said element.

The disclosure may be described in a general context of a computer executable instruction executed by a computer, such as a program module. Generally, the program module includes a routine, a program, an object, a component, a data structure and the like that performs a specific task or implements a specific abstract data type. The disclosure may also be practiced in a distributed computing environment. In a distributed computing environment, a task is executed by a remote processing device connected via a communication network. In a distributed computing environment, the program module may be located in local and remote computer storage mediums, including a storage device.

The embodiments of the present disclosure are described herein in a progressive manner, with the emphasis of each of the embodiments on the difference between it and the other embodiments; hence, for the same or similar parts between the embodiments, one can refer to the other embodiments. Particularly. For an apparatus embodiment, the description is relatively simple since it is substantially similar to a method embodiment, and the related part may refer to parts of the illustration in the method embodiment. The apparatus embodiments described above are just exemplary, in which a module described as a separation component may or may not be separated physically, a component displayed as a module may or may not be a physical module, that is, the component may be located at one place or may also be distributed on multiple network modules. The object of the solutions of the embodiments may be implemented by selecting a part or all of the modules in accordance with actual needs. The disclosure may be understood and implemented by those skilled in the art without any creative work.

The above description just gives the specific embodiments of the disclosure. It should be noted that, many variations and modifications may also be made by those skilled in the art without departing from the principle of the disclosure, and these variations and modifications should be within the scope of protection of the disclosure.

The invention claimed is:

1. An information transmitting method applied to a first electronic device, wherein the first electronic device stores at least one piece of contact information in a contact information set and the first electronic device comprises a display unit having a touch sensing unit, and the method comprises:

detecting, by the touch sensing unit, a first preset input operation and determining a first object and a second object in accordance with the first preset input operation, wherein the first preset input operation is a sliding operation, the first object is determined after the display unit of the first electronic device displays the first object, the second object is determined after the display unit of the first electronic device displays at least a first part of the contact information set, the first object corresponds to first information, the first object is a first contract identifier in an address book of the first electronic device and the first information is contact information, the second object corresponds to second information, the second object is a second contact identifier in the address book of the first electronic device and the second information is second contact information;

determining transmission information in accordance with the first information corresponding to the first object;

determining a transmission parameter in accordance with the second contact information corresponding to the second object; and transmitting the transmission information to a second electronic device by utilizing the determined transmission parameter.

2. The method according to claim 1, wherein the detecting, by the touch sensing unit, a first preset input operation and determining the first object and the second object in accordance with the first preset input operation comprises:

detecting, by the touch sensing unit, a first preset input operation;

acquiring a movement trajectory of the first preset input operation;

acquiring a start position and an end position of the movement trajectory in the case that the movement trajectory is a continuous trajectory; and determining a display object corresponding to the start position of the movement trajectory as the first object, and determining a display object corresponding to the end position of the movement trajectory as the second object.

3. The method according to claim 1, wherein the first information corresponding to the first object is first contact information, and the display unit of the first electronic device displays the first object in a first part of the contact information set; and in the case that the touch sensing unit detects that the first preset input operation is a movement operation for the first object, the method further comprises:

displaying a second part of the contact information set in the case that the movement trajectory for the first preset input operation is detected to contact with a preset boundary of the display unit, wherein the second part of the contact information set is different from the first part of the contact information set, and the second part of the contact information set displays at least the second object.

4. The method according to claim 1, wherein the first information corresponding to the first object is first contact information, the display unit of the first electronic device displays the first object in a first part of the contact information set; the first preset input operation comprises at least a first operation, wherein the first operation is a selection operation for the first object, and the method further comprises:

detecting a third operation in the case that the first operation is detected;

judging whether the third operation is a second preset input operation, to acquire a first judgment result; and displaying a second part of the contact information set in the case that the first judgment result indicates that the third operation is the second preset input operation, wherein the second part of the contact information set is different from the first part of the contact information set, and the second part of the contact information set displays at least the second object, and wherein the first preset input operation further comprises a second operation, and wherein the selection operation for the first object is performed continuously, and the second operation is a movement operation for the first object, and the determining a second object comprises:

acquiring a movement trajectory of the second operation, determining an end position of the movement trajectory, and determining a display object corresponding to the end position of the movement trajectory as the second object.

5. The method according to claim 1, wherein the display unit of the first electronic device is divided into a first region and a second region, wherein at least the first object is displayed at the first region and least the second object is displayed at the second region, and the detecting a first preset input operation comprises:
detecting an input operation; and in the case that the input operation is a movement operation from the first region to the second region and the movement operation associates the first object with the second object, determining the input operation as a first preset input operation.

6. The method according to claim 5, wherein the display unit of the first electronic device comprises a third region, wherein the first part of the contact information set is displayed at the third region and an area of the third region is larger than an area of the first region and an area of the second region, and the method further comprises:
after a first trigger instruction is detected, switching the display unit from displaying at the third region to displaying at the first region and the second region, and
wherein a first part of the contact information set is displayed at the first region, a second part of the contact information set is displayed at the second region, and the first part of the contact information set is the same as or different from the second part of the contact information set.

7. The method according to claim 6, further comprising:
in the case that a first sliding operation is detected at the first region of the display unit, generating a first control instruction to control the first region to switch from displaying the first part of the contact information set to displaying a third part of the contact information set, wherein the first object is located in the third part of the contact information set; and
in the case that a second sliding operation is detected at the second region of the display unit, generating a second control instruction to control the second region to switch from displaying the second part of the contact information set to displaying a fourth part of the contact information set, wherein the second object is located in the fourth part of the contact information set.

8. The method according to claim 1, wherein the first information corresponding to the first object is first contact information, the display unit of the first electronic device displays the first object in a first part of the contact information set, and the determining a first object and a second object comprises:
detecting a fourth operation;
in the case that it is judged that the fourth operation is a selection operation for a display object of the display unit, determining the display object corresponding to the fourth operation as the first object;
displaying a second part of the contact information set in the case that a second trigger instruction is detected, wherein the second part of the contact information set is different from the first part of the contact information set, and at least a second object is displayed at the second part of the contact information set; and in the case that it is detected that a touch for the fourth operation is released, determining a display object corresponding to a release position of the touch as the second object.

9. The method according to claim 1, wherein the first information corresponding to the first object is first contact information, the display unit of the first electronic device displays the first object in a first part of the contact information set, and the determining a first object and a second object comprises:
detecting a fifth operation;
in the case that it is judged that the fifth operation is a selection operation for a display object of the display unit of the first electronic device and the selection operation satisfies a third preset condition, determining the display object corresponding to the fifth operation as the first object;
displaying a first identifier for the first object, and the first identifier is superposed upon a display object of the display unit of the first electronic device to be displayed;
displaying a second part of the contact information set in the case that a third trigger instruction is detected, wherein the second part of the contact information set is different from the first part of the contact information set, and at least a second object is displayed in the second part of the contact information set; and
detecting a sixth operation, and in the case that it is judged that the sixth operation is a movement operation for the first identifier, acquiring a movement trajectory corresponding the movement operation and determining a display object corresponding to an end position of the movement trajectory as the second object.

10. The method according to claim 1, wherein the determining a first object and a second object comprises:
acquiring a first selection operation and determining a first object in accordance with the first selection operation; and
acquiring a second selection operation and determining a second object in accordance with the second selection operation,
wherein the first selection operation happens before the second selection operation.

11. The method according to claim 1, wherein the display unit comprises a first region and a second region, and the determining a first object and a second object comprises:
acquiring a third selection operation, wherein the third selection operation is an operation for at least one display object of the first region;
acquiring a fourth selection operation, wherein the fourth selection operation is an operation for at least one display object of the second region; and
determining the at least one display object selected in the first region as the first object and determining the at least one display object selected in the second region as the second object, and
wherein a second identifier is displayed at the first region of the display unit, a third identifier is displayed at the second region of the display unit, and the determining the at least one display object selected in the first region as the first object and the determining the at least one display object selected in the second region as the second object comprise:
performing sliding operations on the first region and the second region respectively in accordance with an operation of a user; and determining a display object superposed with the second identifier as the first object, and determining a display object superposed with the third identifier as the second object.

12. The method according to claim 1, wherein the determining a first object and a second object comprises:
  determining the first object and the second object in the case that the display unit of the first electronic device displays the first object and the second object simultaneously.

13. The method according to claim 1, wherein the transmitting the transmission information by utilizing the determined transmission parameter comprises:
  selecting, by utilizing the determined transmission parameter, a transmission application corresponding to the transmission parameter, to transmit the transmission information.

14. A first electronic device, comprising a display unit having a touch sensing unit, and wherein the first electronic device further comprises:
  an object determination unit adapted to detect a first preset input operation by the touch sensing unit and determine a first object and a second object in accordance with the first preset input operation, in the case that the first electronic device stores at least one piece of contact information in a contact information set, wherein the first preset input operation is a continuous input operation, the first object is determined after the display unit of the first electronic device displays the first object, the second object is determined after the display unit of the first electronic device displays at least a first part of the contact information set, the first object corresponds to first information, the first object is a first contact identifier in an address book for the first electronic device and the first information is contact information, the second object corresponds to second information, the second object is a second contact identifier in the address book of the first electronic device and the second information is second contact information;
  a transmission information determination unit adapted to determine transmission information in accordance with the first information corresponding to the first object;
  a transmission parameter determination unit adapted to determine a transmission parameter in accordance with the second contact information corresponding to the second object; and
  a transmitting unit, adapted to transmit the transmission information to a second electronic device by utilizing the determined transmission parameter.

15. The first electronic device according to claim 14, wherein the first preset input operation is a continuous input operation, and
  wherein the object determination unit comprises:
  a first detection unit adapted to detect, by the touch sensing unit, a first preset input operation;
  a first acquisition unit adapted to acquire a movement trajectory of the first preset input operation;
  a second acquisition unit adapted to acquire a start position and an end position of the movement trajectory in the case that the movement trajectory is a continuous trajectory; and
  a first determination unit adapted to determine a display object corresponding to the start position of the movement trajectory as the first object, and determine a display object corresponding to the end position of the movement trajectory as the second object.

16. The first electronic device according to claim 15, wherein the first information corresponding to the first object is first contact information, and the display unit of the first electronic device displays the first object in a first part of the contact information set; and
  the display unit of the first electronic device is further adapted to:
  display a second part of the contact information set in the case that the touch sensing unit detects that the first preset input operation is a movement operation for the first object and when it is detected that the movement trajectory for the first preset input operation contacts with a preset boundary of the display unit, wherein the second part of the contact information set is different from the first part of the contact information set, and at least the second object is displayed at the second part of the contact information set.

17. The first electronic device according to claim 15, wherein the first information corresponding to the first object is first contact information, the display unit of the first electronic device displays the first object in a first part of the contact information set; the first preset input operation comprises at least a first operation, wherein the first operation is a selection operation for the first object, and the first electronic device further comprises:
  a third detection unit adapted to detect a third operation in the case that the first operation is detected;
  a first judging unit adapted to judge whether the third operation is a second preset input operation, to acquire a first judgment result; and
  wherein the display unit is further adapted to display a second part of the contact information set in the case that the first judgment result indicates that the third operation is the second preset input operation, wherein the second part of the contact information set is different from the first part of the contact information set, and at least the second object is displayed at the second part of the contact information set,
  wherein the first preset input operation further comprises a second operation, wherein the selection operation for the first object is performed continuously, and the second operation is a movement operation for the first object, and the object determination unit is adapted to:
  acquire a movement trajectory of the second operation, determine an end position of the movement trajectory, and determine a display object corresponding to the end position of the movement trajectory as the second object.

18. The first electronic device according to claim 14, wherein the display unit of the first electronic device is divided into a first region and a second region, wherein at least the first object is displayed at the first region and at least the second object is displayed at the second region, and the first detection unit is further adapted to:
  detect an input operation; and when the input operation is a movement operation from the first region to the second region and the movement operation is adapted to associate the first object with the second object, determine the input operation as a first preset input operation, and
  wherein the display unit of the first electronic device further comprises a third region, the first part of the contact information set is displayed at the third region and an area of the third region being larger than an area of the first region and an area of the second region, and the display unit of the first electronic device is further adapted to:

switch the display unit from displaying at the third region to displaying at the first region and the second region, after a first trigger instruction is detected.

19. A first terminal, comprising a display unit having a touch sensing unit, and the first terminal further comprising:
- a storage unit adapted to store at least one piece of contact information in a contact information set;
- a processing unit adapted to detect a first preset input operation by the touch sensing unit and determine a first object and a second object in accordance with the first preset input operation, wherein the first preset input operation is a continuous input operation, the first object is determined after the display unit of the first terminal displays the first object, the second object is determined after the display unit of the first terminal displays at least a first part of the contact information set, the first object corresponds to first information, the first object is a first contact identifier in a address book for the first terminal and the first information is contact information, the second object corresponds to second information, a second object is a second contact identifier in the address book for the first terminal and the second information is second contact information; determine transmission information in accordance with the first information corresponding to the first object, and determine a transmission parameter in accordance with the second contact information corresponding to the second object; and
- a communication unit adapted to transmit the transmission information to a second electronic device by utilizing the determined transmission parameter.

* * * * *